US012717722B2

(12) United States Patent

Xia et al.

(10) Patent No.: US 12,717,722 B2
(45) Date of Patent: Aug. 25, 2026

(54) DIFFERENTIAL MATCHING PREFETCHER FOR COPING WITH IRREGULAR MEMORY ACCESS

(71) Applicant: XI'AN JIAOTONG UNIVERSITY, Xi'an (CN)

(72) Inventors: Tian Xia, Xi'an (CN); Gelin Fu, Xi'an (CN); Zhongpei Luo, Xi'an (CN); Wenzhe Zhao, Xi'an (CN); Pengju Ren, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 26 days.

(21) Appl. No.: 18/898,939

(22) Filed: Sep. 27, 2024

(65) Prior Publication Data

US 2025/0245161 A1 Jul. 31, 2025

(30) Foreign Application Priority Data

Jan. 29, 2024 (CN) ........................ 202410122002.1

(51) Int. Cl.

| | |
|---|---|
| ***G06F 12/08*** | (2016.01) |
| ***G06F 9/32*** | (2018.01) |
| ***G06F 12/02*** | (2006.01) |
| ***G06F 12/0811*** | (2016.01) |
| ***G06F 12/0862*** | (2016.01) |

(52) U.S. Cl.

CPC .......... *G06F 12/0862* (2013.01); *G06F 9/321* (2013.01); *G06F 12/0292* (2013.01); *G06F 12/0811* (2013.01)

(58) Field of Classification Search

CPC .. G06F 12/0862; G06F 9/321; G06F 12/0292; G06F 12/0811; G06F 2212/1008; G06F 2212/1024; G06F 2212/6024; G06F 12/0877

USPC .......................................................... 711/118

See application file for complete search history.

(56) References Cited

U.S. PATENT DOCUMENTS

2013/0346703 A1* 12/2013 McCauley .......... G06F 12/0862 711/137
2023/0205440 A1* 6/2023 Jo .......................... G06F 3/064 711/154
2025/0004945 A1* 1/2025 Vasekin .............. G06F 12/0862

* cited by examiner

*Primary Examiner* — Hua J Song

(57) ABSTRACT

A differential matching prefetcher for coping with irregular memory access includes: an access index table, an access target table, a differential matching module, an index queue, an indirect memory access candidate scoreboard, an address generator, an indirect memory access relationship table, a prefetch status handling register, a repetition filter, a continuous address filter, and a range prefetch table. The differential matching prefetcher is configured to monitor events of access requests and data responses between a computing core and a first level of cache, as well as between the first level of cache and a second level of cache. The differential matching prefetcher may be applied in various general-purpose computing architectures adopting a hierarchical storage design to realize mode capture and data prefetch for irregular indirect memory access, reduce long-delay storage access overhead caused by the irregular memory access, and increase instructions per cycle (IPC) of the computing architectures.

9 Claims, 15 Drawing Sheets

(a) Breadth-first search (b) BFS indirect memory access mode

| Index PC | Last Index | Index Diff1 | Index Diff2 | Index Diff3 | Index Diff4 | Index Diff5 | Index Diff6 | Index Diff7 | Index Diff8 |
|---|---|---|---|---|---|---|---|---|---|
| | | | | | | | | | |

| Target PC | Last Addr | Target Range Counter | Addr Diff1 | Addr Diff2 | Addr Diff3 |
|---|---|---|---|---|---|
| | | | | | |

| Index PC | Tried | Matched |
| --- | --- | --- |
| | | |

| Index PC | Sample Counter | Candidate 1 | | Candidate 2 | | ... |
| --- | --- | --- | --- | --- | --- | --- |
| | | PC | Miss Num | PC | Miss Num | |
| | | | | | | ... |

| ID | Enable | Index PC | Target PC | Base Addr | Shift | Index Type | Target Type |
|---|---|---|---|---|---|---|---|
| | | | | | | Stream/Single/Range | Stream/Single/Range |
| | | | | | | | |
| | | | | | | | |

| Valid | IRT ID | Prefetch Address | Bitmap |
|---|---|---|---|
| | | | |

| IRT ID | Sample Counter | Sampled Range | | | | | | | | | Predicted Range |
|---|---|---|---|---|---|---|---|---|---|---|---|
| | | 1-2 | 3-4 | 5-6 | 7-8 | 9-10 | 11-12 | 13-14 | 15-16 | >16 | |
| | | | | | | | | | | | |

for(i=0; j<N; ++j)
for(i=0; i<size[j]; ++i)
tmp[j] += x[a[b[i]]]
...

Stride Prefetcher

Selection of a candidate target PC

PC (Load b[i])

Load a

Round1

Round2

Round3

Round4

Indirect memory access candidate scoreboard

Index queue

Target address differential sequence
PC (Load x)
Addr4 Addr3 Addr2 Addr1
-2 -4 +6
Sliding differential matching
Insertion after matching
PC (Load b[i]) PC (Load a) Base Addr
PC (Load a) PC (Load x) Base Addr
Indirect memory access relationship table
PC (Load a)
Data5 Data4 Data3 Data2 Data1
Index data differential sequence
Addr4 Addr3 Addr2 Addr1
-3 -5 +7
Target address differential sequence
Insertion after matching
PC (Load b[i])
Data5 Data4 Data3 Data2 Data1
Index data differential sequence
Sliding differential matching

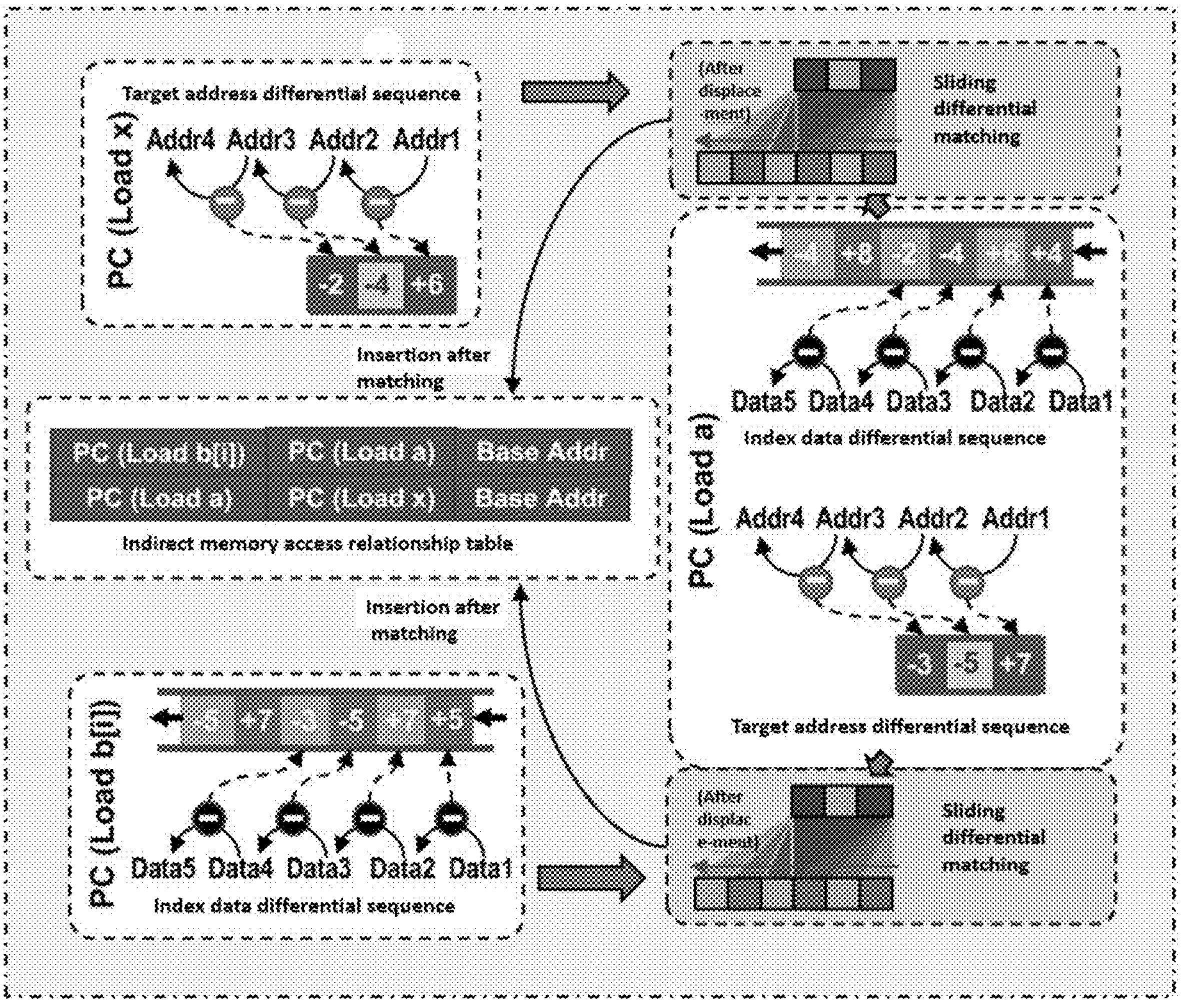

FIG. 24

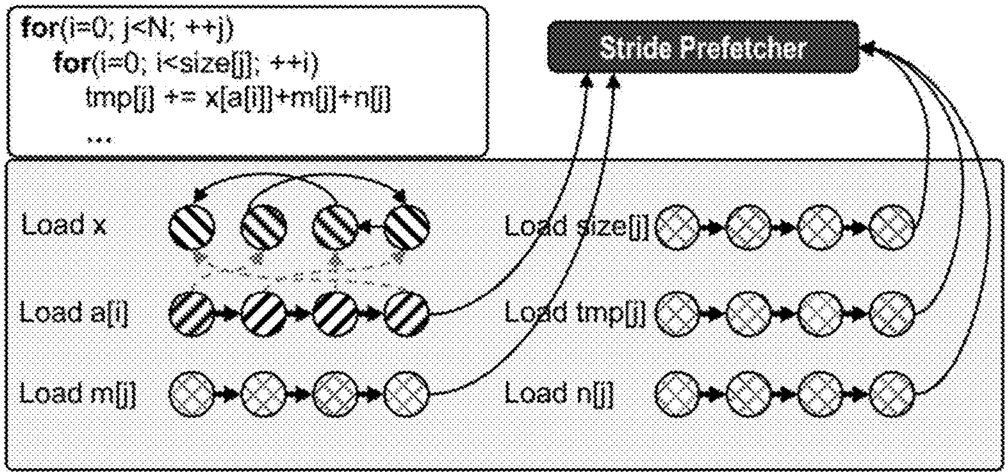

FIG. 25

| Index PC | Tried | Matched |
|---|---|---|
| 0xf1 | 1 | 1 |
| 0xf2 | 1 | 0 |
| 0xf3 | 1 | 0 |
| 0xf4 | 1 | 0 |

| Index PC | Tried | Matched |
|---|---|---|
| 0xf5 | 0 | 0 |
| 0xf2 | 1 | 0 |
| 0xf3 | 1 | 0 |
| 0xf4 | 1 | 0 |

DIFFERENTIAL MATCHING PREFETCHER FOR COPING WITH IRREGULAR MEMORY ACCESS

CROSS-REFERENCE TO RELATED APPLICATION

This application claims priority from the Chinese patent application 2024101220021 filed Jan. 29, 2024, the content of which is incorporated herein in the entirety by reference.

TECHNICAL FIELD

The present disclosure is directed to the technical field of processors and caches, and particularly relates to a differential matching prefetcher for coping with irregular memory access.

BACKGROUND

A memory access wall is a key bottleneck in current applications such as a graph computation and a sparse linear algebra computation. This bottleneck is mainly caused by irregular memory access. Namely, a data address that needs to be accessed is random and irregular. This irregular property results in a partial loss of a data space, making a cache structure unable to play its role, as manifested in the large number of cache misses, and data is eventually fetched from a network-on-chip or a DRAM after a long delay. In the irregular memory access, the most common is an indirect memory access mode in a form of x[a[i]].

A current mainstream CPU uses prefetchers to predict the data address that is likely to be accessed in the future and puts the data into a cache in advance to hide the long delay of data access. But these prefetchers tend to be stream prefetchers, which perform prefetching by capturing regular stream memory access modes. However, the stream prefetchers cannot be adapted to the indirect memory access mode, either in terms of design principles or in terms of practical effects. Although the prior art may aid in the prediction of indirect memory access by capturing stream access to index data, a hardware prefetcher using this type of design idea can only be applicable to a case of fixed-order access to the index data, and cannot be well applied to a modern CPU with an out-of-order multi-transmission design.

SUMMARY

To solve the above problems, the present disclosure provides a differential matching prefetcher for coping with irregular memory access, including:

- an access index table, an access target table, a differential matching module, an index queue, an indirect memory access candidate scoreboard, an address generator, an indirect memory access relationship table, a prefetch status handling register, a repeating filter, a continuous address filter, and a range prefetch table.

A main feature of an indirect memory access mode is that an access address of a current memory access instruction is computed from response data of other memory access instructions, so there is a special correspondence between response data and access addresses of different memory access instructions. The differential matching prefetcher is configured to monitor events of access requests and data responses between a computing core and a first level of cache, between the first level of cache and a second level of cache, as well as between the second level of cache and a third level of cache, and to directly make a correspondence between the response data and the access addresses of the different memory access instructions based on differential matching between the response data and the access addresses, so as to accurately capture the special correspondence of the memory access instructions in the indirect memory access mode, and realize the prediction of the access addresses in the indirect memory access mode, so that a memory access bandwidth utilization ratio may be increased and data waiting time of a CPU may be reduced by accurate data prefetch, thereby significantly improving CPU computing performance. Compared to an existing disclosed prefetching technique, the present disclosure firstly realizes accurate recognition and data prefetch for a variety of indirect memory access modes through a hardware circuit design alone.

The differential matching prefetcher disclosed by the present disclosure can be applied to a modern CPU with an out-of-order multi-transmission design and adapted to the indirect memory access mode, and can be applied in various general-purpose computing architectures adopting a hierarchical storage design to realize mode capture and data prefetch for the irregular indirect memory access, reduce long-delay storage access overhead caused by the irregular memory access, and increase instructions per cycle (IPC) of the computing architectures.

BRIEF DESCRIPTION OF DRAWINGS

FIG. 24 is a schematic diagram of differential matching of a two-level indirect memory access relationship in an embodiment of the present disclosure.

FIG. 25 is a schematic diagram of five stream access behaviors and one indirect memory access relationship in an embodiment of the present disclosure.

DETAILED DESCRIPTION OF THE INVENTION

Figure 1:
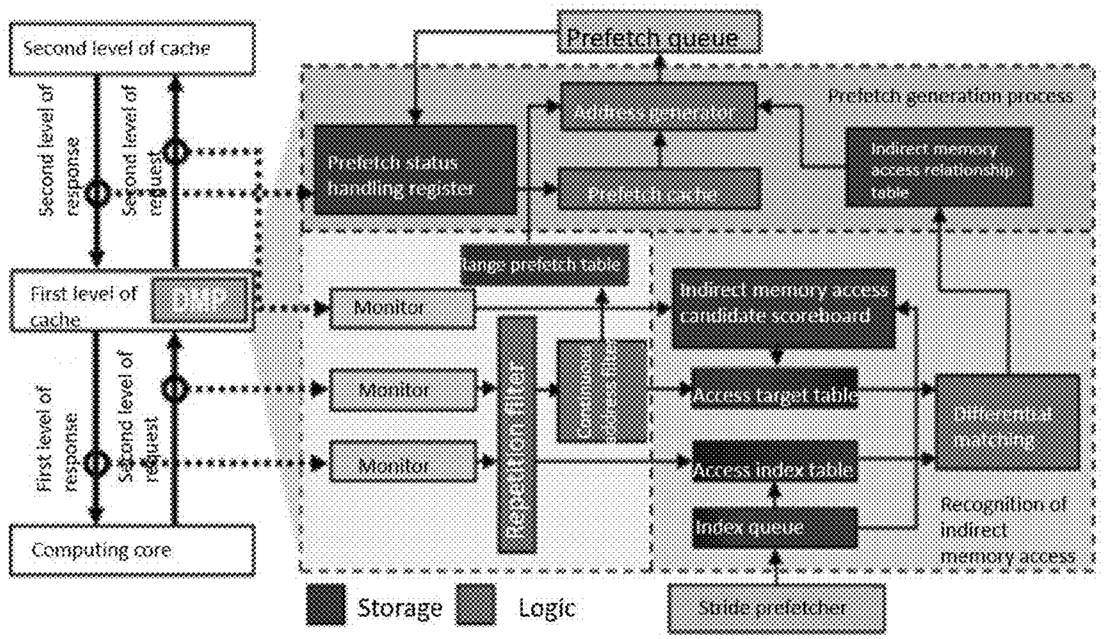
FIG. 1 is a diagram of an overall architecture of a differential matching prefetcher for coping with irregular memory access provided in an embodiment of the present disclosure.

In an embodiment, as shown in FIG. 1, the present disclosure provides a differential matching prefetcher (hereinafter referred to as a DMP) for coping with irregular memory access, including: an access index table, an access target table, a differential matching module, an index queue, an indirect memory access candidate scoreboard, an address generator, an indirect memory access relationship table, a prefetch status handling register, a repetition filter, a continuous address filter, and a range prefetch table, and the differential matching prefetcher realizes data prefetch according to monitored events of access requests and data responses between different levels in a hierarchical storage structure of a CPU.

With respect to this embodiment, the differential matching prefetcher (DMP) is a differential-matching-based differential matching prefetcher that enables capture and address prediction of an indirect memory access mode based on differential matching between index data and an indirect memory access address, and has very low hardware resource overhead. A differential is a computational method. In the present disclosure, a main object of action of the differential method is a sequence, for which a new sequence is obtained by subtracting a previous term from each non-first term, and this new sequence may be referred to as a differential sequence of the original sequence.

The differential matching prefetcher mainly includes: a prefetch functional unit having a hardware circuit entity support. When working together with a cache, the differential matching prefetcher analyzes a behavior of the cache (e.g., a miss), reads corresponding information (e.g., address information of a data request), performs processing according to a certain prefetch address prediction algorithm (the algorithm is described in detail in a prefetch address computation formula below), generates a prediction of a data address that may be used by a program in the future, and adds the predicted address to a prefetch queue. After a de-repetition check (timeliness check), the predicted address is added to a miss status holding register (MSHR) of the cache, and then further distributed to a DRAM module. These prefetched data blocks are placed in a remaining unused space in the cache and may be returned directly to a computing core as cache hits in the future when they are actually needed.

In another embodiment, the differential matching prefetcher realizes data prefetch according to monitored events of access requests and data responses between different levels in a hierarchical storage structure of the CPU, which may be that the differential matching prefetcher realizes the data prefetch according to monitored events of access requests and data responses between the computing core and a first level of cache, as well as between the first level of cache and a second level of cache. It may also be that the differential matching prefetcher performs data prefetch according to monitored events of access requests and data responses between the computing core and the first level of cache, as well as between the second level of cache and a third level of cache. It may also be that the differential matching prefetcher performs data prefetch according to monitored events of access requests and data responses between the computing core and the first level of cache, between the first level of cache and the second level of cache, as well as between the second level of cache and the third level of cache.

In another embodiment, the present disclosure further discloses a CPU, and the CPU includes the differential matching prefetcher for coping with the irregular memory access.

Exemplarily, the differential matching prefetcher of the present disclosure predicts an access address of a corresponding PC (e.g., a memory access instruction PC in a program), wherein the PC refers to a program counter in the field.

In another embodiment, the differential matching prefetcher of the present disclosure is located in the first level of cache in the hierarchical storage structure of the CPU. It can be understood that the differential matching prefetcher of the present disclosure may also be located in other levels of caches in the hierarchical storage structure of the CPU.

It needs to be noted that on the hierarchical storage structure of the CPU, except for some data bypasses, all kinds of requests on each level about storage interact with information on the next level through corresponding data paths. The differential matching prefetcher of the present disclosure has a monitoring function, which reads and filters information transmitted on the data paths using a dedicated functional unit, and sends the filtered information needed for a design to other corresponding functional units.

Figure 2:
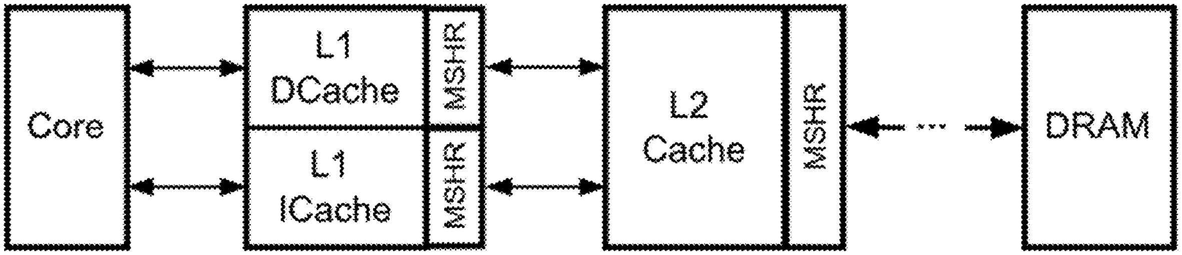
FIG. 2 is a schematic diagram of a CPU storage hierarchical structure in an embodiment of the present disclosure.

With respect to this embodiment, FIG. 2 shows a hierarchical storage structure of a current mainstream CPU. A CPU core is connected to a DRAM through multiple levels of caches, wherein content types distinguished by the first level of cache, L1 Cache, are instructions and data (reflecting characteristics of a Harvard architecture), and L1 ICache and L1 DCache are set to correspond to cached contents of the instructions and the data respectively. Each level of cache compares a request address sent from the previous level to all addresses it has cached. If the comparison is successful, the request is returned to the previous level (called a cache hit), and if the match fails, a request is sent to the next level (called a cache miss). For each level of cache, when a miss is generated, the cache has a specialized set of registers to store all miss requests and send them down to the next level, called miss status holding registers (MSHRs).

The CPU core fetches instructions through L1 ICache and subsequent multiple levels of caches to reach the DRAM, and fetches the corresponding instruction up from an address pointed to by a program pointer (PC) and into an execution unit for execution. Store and Load related instructions form a request for the data address that the program needs to use, and the request passes through L1 DCache and subsequent multiple levels of caches to reach the DRAM, and then returns from the DRAM (in the case of the cache miss) or from any level of cache (in the case of the cache hit) to obtain data on the corresponding request address.

In another embodiment, one form of the irregular memory access is irregular memory access, and types of the indirect memory access include: multi-level indirect memory access, multi-way indirect memory access, indirect single-point memory access, and indirect range memory access.

With respect to this embodiment, the memory access mode refers primarily to a reading mode of the program with respect to DRAM data, including Load requests and Store requests, as well as a length of different request data. The memory access mode may be broadly categorized into regular memory access and irregular memory access according to their own regularity, wherein, A typical form of the regular memory access (i.e., regular memory access in the academic literature in this field) is stream memory access (stream type). Stream memory access means that accessed data addresses are arranged linearly, and the neighboring accessed data addresses are at a fixed distance from each other. A stream memory access mode may be easily recognized and predicted, and the most common case is a search of arrays. The irregular memory access means that there is no obvious regularity in accessed data addresses, or they will be dynamically determined at runtime according to the data content used by the program.

As mentioned previously, a typical form of irregular memory access (i.e., irregular memory access in the academic literature in this field) is indirect memory access (i.e., indirect memory access in the academic literature in this field). The indirect memory access is the use of a value in one data structure to index access to a value in another data structure. A basic form of the indirect memory access is shaped like x[a[i]], i is a cyclically incrementing variable that increments by one each time of execution, and access to an array a is called stream access. Since data on a[i] is randomly distributed, access to an array x is irregular, and the access to the array x is called indirect memory access. x[a[i]] is indirect memory access that uses values of the array a to index access to the array x, called a set of indirect memory access relationships. A PC value corresponding to an access instruction to the index array a is called an index PC value, and a PC value corresponding to an access instruction to the target array x is called a target PC value.

In practical computational scenarios, such as that of a breadth-first search of a graph, the composition of the indirect memory access mode is often complex, mainly described as follows:

i. according to dependencies among a variety of indirect memory access relationships, it may be divided into the following 2 categories:

(1) multi-level indirect memory access (Multi-level): the indirect memory access mode with two or more levels of access dependencies is called a multi-level indirect memory access mode, for example, y[x[a[i]]] formed by the array a, the array x, and an array y.

Under multi-level indirect memory access, a current stream memory access instruction is first recognized and extracted using a stride prefetcher in the prior art. For example, the stride prefetcher computes a difference between the current request address and the last request address. If a plurality of consecutive differences is the same, it is considered to recognize one piece of stream memory access, the previously computed address differences are used to compute a data address that may need to be requested by a program in the future, and the data address is taken out of the DRAM and placed into the cache. The differential matching prefetcher of the present disclosure then matches a memory access instruction of subsequent indirect memory access based on the stream memory access instruction. Similarly, the differential matching prefetcher of the present disclosure may further continue to backward match a memory access instruction of more subsequent indirect memory access based on a memory access instruction of the subsequent indirect memory access.

It can be understood that a single level is a special form of multi-level, and when the number of levels is 1, it is still possible to first recognize and extract the current stream memory access instruction using the stride prefetcher in the prior art. The differential matching prefetcher of the present disclosure then matches a memory access instruction of subsequent Level 1 indirect memory access based on the stream memory access instruction.

It needs to be noted that if the differential matching prefetcher of the present disclosure is implemented as an independent component, it may utilize the stride prefetcher that comes with the CPU so as to realize the above single-level indirect memory access or multi-level indirect memory access. If the differential matching prefetcher of the present disclosure is directly implemented in the CPU as a part, it may cooperate with the stride prefetcher in another part of the CPU so as to realize the above single-level indirect memory access or multi-level indirect memory access. It can be understood that there can be alternative forms of implementation, for example, the differential matching prefetcher of the present disclosure is directly implemented in the CPU as a part, while the differential matching prefetcher of the present disclosure further includes the stride prefetcher to realize the above single-level indirect memory access or multi-level indirect memory access.

(2) Multi-way indirect memory access (Multi-way): the indirect memory access mode with a certain index corresponding to a plurality of targets is called a multi-way indirect memory access mode, for example, x[a[i]]+z[a[i]] formed by the array a, the array x, and an array z.

ii. according to the number of accesses to the target PC value generated in a set of indirect memory access relationships for the index data fetched by an index PC value, it may be divided into the following 2 categories:

a) indirect single-point memory access (Single): a value of a certain piece of data is the access index of a single piece of data of the target array, and this access mode is called an indirect single-point memory access mode, for example, an x[a[i]] access stream formed by the array a, and the array x.

b) Indirect range memory access (Range): there is a certain piece of data, its value is used as a starting position index and used to access a certain local range of the target array continuously, and this access mode is called an indirect range memory access mode, for example, x[a[i]], x[a[i]+1], x[a[i]+2] . . . x[a[i]+j] access streams formed by the array a, and the array x.

Further, the above several indirect memory access relationships may be combined with each other. For example, in y[x[a[i]]], y[x[a[i]+1]], y[x[a[i]+2]] . . . y[x[a[i]+j]] access streams formed by the array a, the array x, and the array y, access to data a and the array x constitutes the indirect range memory access, access to data x and the array y constitutes the indirect single-point memory access, and access to the array a, the array x, and the array y constitutes the multi-level indirect memory access.

Figures 3, 4, 5:
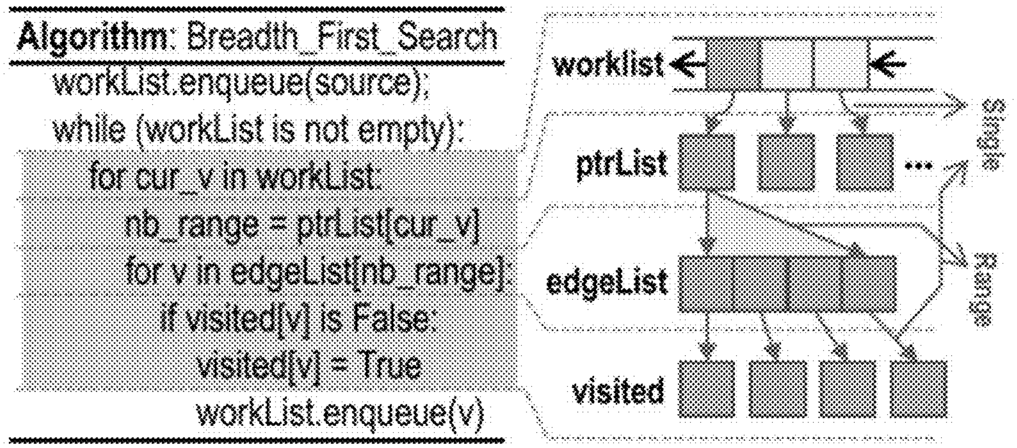
FIG. 3 is a schematic diagram of a breadth-first search for a graph in an embodiment of the present disclosure.
FIG. 4 is a schematic structural diagram of an access index table in an embodiment of the present disclosure.
FIG. 5 is a schematic structural diagram of an access target table in an embodiment of the present disclosure.

FIG. 3 shows a breadth-first search (BFS)) for a graph, a core idea of which is to maintain a worklist queue, and search its neighboring nodes each time a node is out of the queue (ptrList), and outgoing access is in the indirect memory access mode of the type of indirect single-point memory access (Single). The information of adjacent edges is the data stored in consecutive adjacencies (edgeList), and the access to the information of these adjacent edges is in an indirect memory access mode of the type of indirect range memory access (Range). According to the information of the edges, information of the node may be obtained (visited), and access to the information of the node is in an indirect memory access mode of the type of indirect single-point memory access (Single).

In another embodiment, the access index table, the access target table, the differential matching module, the index queue, and the indirect memory access candidate scoreboard are responsible for recognition of an indirect memory access relationship. The address generator, the indirect memory access relationship table, and the prefetch status handling register are responsible for generation and initiation of an actual prefetch behavior. The repetition filter, the continuous address filter, and the range prefetch table are responsible for filtering a request address stream and a response data stream that are directly monitored.

With respect to this embodiment, the differential matching prefetcher (including the DMP) of the present disclosure, according to a certain prefetch address prediction algorithm (the algorithm is described in detail in a prefetch address computation formula below), triggers generation of a corresponding prefetch address by a specific hardware event (e.g., events of data access, and a data return), and the prefetch address is placed into a prefetch queue to wait for a suitable time to be sent to the lower level of storage structure for fetching data. The prefetch queue caches a prefetch request that needs to be sent in the future. Each prefetch request is sent first for storage of request information in the prefetch status handling register (PSHR), and then sent to the lower level of structure to wait for data response and backfill from the lower level of structure.

Continuing from the previous section, the monitoring function of the differential matching prefetcher of the present disclosure may be realized by means of a monitoring module. A main function of the monitoring module is to capture the request address and response data on a request response line between existing levels of structures. Exemplarily, the monitoring module may realize the following specific monitoring functions: request monitoring sent from the CPU to the first level of cache, response monitoring returned from the first level of cache to the CPU, request monitoring sent from the first level of cache to the second level of cache, response monitoring returned from the second level of cache to the first level of cache, etc.

For example, in the present disclosure, the request address sent from the CPU to the first level of cache, the response data returned from the first level of cache to the CPU, the request address sent from the first level of cache to the second level of cache, the response data returned from the second level of cache to the first level of cache, etc. may be sent to the access target table, the access index table, the indirect memory access candidate scoreboard, and the address generator through the monitoring module, so as to help the other functional units to complete the corresponding comparison and recording functions.

In another embodiment, the differential matching prefetcher of the present disclosure further includes a stride prefetcher.

With respect to this embodiment, the purpose of the stride prefetcher is to assist the detection of the indirect memory access mode by the differential matching prefetcher of the present disclosure. Exemplarily, the specific working manner may be as follows: the stride prefetcher provides the access index table with program counters (PCs) corresponding to stream access, and these PCs may become index PCs in the indirect memory access mode. An access dependency chain of the indirect memory access mode generally starts with a stream access type (Stream type).

In another embodiment, a repetition filter module is a logical functional module for filtering the access request stream and the response data stream between the CPU and the first level of cache. An object of filtering is the same address or data continuously appearing, i.e., if the monitored address or data is the same as the last monitored address or data, it will be discarded, and no repeated address or data is exposed to the subsequent modules.

In another embodiment, a continuous address filter module is a logical functional module for filtering the access address request stream sent from the CPU to the first level of cache. In the overall architectural topology, the continuous address filter module is connected after the repetition filter module to filter continuously increasing access address requests. The address request stream filtered by the continuous address filter module is sent to the access target table. During the filtering process, range values are recorded at the same time, i.e., the number of the continuously increasing access address requests, and the recorded range values are sent to the range prefetch table and recorded by the range prefetch table.

In another embodiment, as shown in FIG. 4, the access index table is a unit with a storage function in which each table entry is divided into three parts: an index PC value (Index PC), last monitored index data (Last Index), and a differential sequence of index data (Index Diff).

For a PC value that is stored in the index queue and requires recognition of an indirect memory access relationship, the access index table maintains a corresponding table entry for the PC value and stores this PC value in the first part of the table entry, which is called the index PC value (Index PC). The second part of the table entry stores the last monitored index data (Last Index) of the index PC value. The third part (IndexDiff) stores the differential sequence of the index data.

In a design phase, a length of the differential sequence of the index data (Index Diff) is a configurable parameter in the access index table of the differential matching prefetcher of the present disclosure. For example, a length of 8 means that the last eight times of index data differences are recorded, wherein each difference is the difference between the monitored index data and its corresponding last monitored index data. Although the length of this part is limited, the access index table always rolls to update the differential sequence of the index data corresponding to the index PC value, i.e., eliminating the oldest data difference and inserting the newest data difference.

When the differential matching prefetcher of the present disclosure operates, it monitors a data return value on a CPU memory access port and the PC value of the corresponding memory access instruction, and checks whether the PC value thereof is consistent with the index PC value of the first part of each table entry of the access index table. If the PC values in the above check are consistent, for this table entry, the third part, i.e., the differential sequence of the stored index data, is updated by the return data that will be monitored. Specifically, the difference between the data monitored this time and the data of the existing second part (Last Index) is computed, and this difference is updated to the third part, i.e., the differential sequence of the stored index data. Thereafter, the data in the second part (Last Index) is updated to the data monitored this time.

The main purpose of the design of the indirect memory access candidate scoreboard is to screen the candidate target PC value based on the case of a cache miss as the target PC value to be matched, and send the candidate target PC value to the access target table for further information statistics and subsequent matching of an indirect memory access relationship. Each table entry in the indirect memory access candidate scoreboard is divided into three parts. The first part stores the index PC value (Index PC) sent by the index queue. The second part stores a sample counter. The third part is multiple sets of stored candidate target information (Candidate), wherein each set of information contains a candidate target PC value and its cache miss number counter (Miss Num).

A selection mechanism for the candidate indirect memory access PC uses a sampling mechanism. A specific method is to start with an access request of each index PC value for the cache, and count the PC values of the source access instructions of a certain number of cache miss requests thereafter. The number of total cache miss requests per sampling is called a sampling window and is a configurable parameter. Sampling one window number of miss numbers is called a round of sampling. The sample counter of the second part stores the total number of samplings triggered by the index PC value (Index PC) of the first part. The PC value corresponding to the cache miss monitored during the sampling process is stored as the candidate target PC value together with its corresponding number of cache misses in a certain group of candidate target information (Candidate) of the third part. In practical work, for an index PC value, multiple rounds of sampling need to be triggered by its multiple data access requests. A result of each round of sampling is accumulated with the previous statistical result. The total number of rounds of sampling is a configurable parameter. At the end of all the rounds of sampling corresponding to a certain index PC value, the indirect memory access candidate scoreboard preferentially selects the candidate target PC value with the largest value of the cache miss number counter (Miss Num) (corresponding to the number of cache misses generated) and sends it to the access target table as the target PC value to be matched (Target PC) for priority matching.

In another embodiment, as shown in FIG. 5, the access target table is a unit with a storage function for recording prefetch target address information, and each table entry in the table is divided into four parts: a target PC value to be matched (Target PC), last monitored target address (Last Addr), a target range counter, and a differential sequence of a target address (Addr Diff).

For the target PC value to be matched screened by the indirect memory access candidate scoreboard, the access target table maintains a corresponding table entry for it. The first part of the table entry is the corresponding target PC value to be matched (Target PC). The second part of the table entry, i.e., the address of the last request (Last Addr), stores the address of the last request generated by the last instruction of the target PC value to be matched of this table.

The third part of the table entry, i.e., the target range counter, records the maximum value of the continuous length of the access address corresponding to the target PC value to be matched of the table entry, which is used for subsequently judging whether the indirect memory access relationship is indirect range memory access. This data is provided by the continuous address filter module above.

The fourth part of the table entry, i.e., the target address differential sequence (Addr Diff), stores the difference between the target access address monitored each time and the target access address of the previous time. The length of this part is a configurable parameter, e.g. a length of 3 means that the difference between the last three times of target access address updates and the previous address is recorded. Updates to this table entry stop when all address differences in this part are filled. Each time a differential sequence of a certain table entry of the access target table is filled, a matching behavior is triggered for the table entry. This matching behavior is completed by the differential matching module described later.

When the differential matching prefetcher of the present disclosure operates, it monitors a data access address on a CPU memory access port and the PC value of the corresponding memory access instruction, and checks whether the PC value thereof is consistent with the target PC value to be matched of the first part of each table entry of the access target table. If the PC values in the above check are consistent, for this table entry, the fourth part, i.e., the differential sequence of the target address, is updated by the access address that will be monitored. Specifically, the difference between the address monitored this time and the data stored in the existing second part (Last Addr) is computed, and this difference is updated to the fourth part, i.e., the differential sequence of the target address. Thereafter, the data in the second part (Last Addr) is updated to be the address monitored this time.

In another embodiment, the differential matching module is a main logical operation functional unit for recognizing an indirect memory access relationship and uses a sliding matching method to match the differential sequence of target addresses of table entries in the access target table that have stopped being updated (e.g., 3 differential sequences of the target addresses have been filled) with the differential sequence of index data of all table entries in the access index table.

Figures 6, 7, 8:
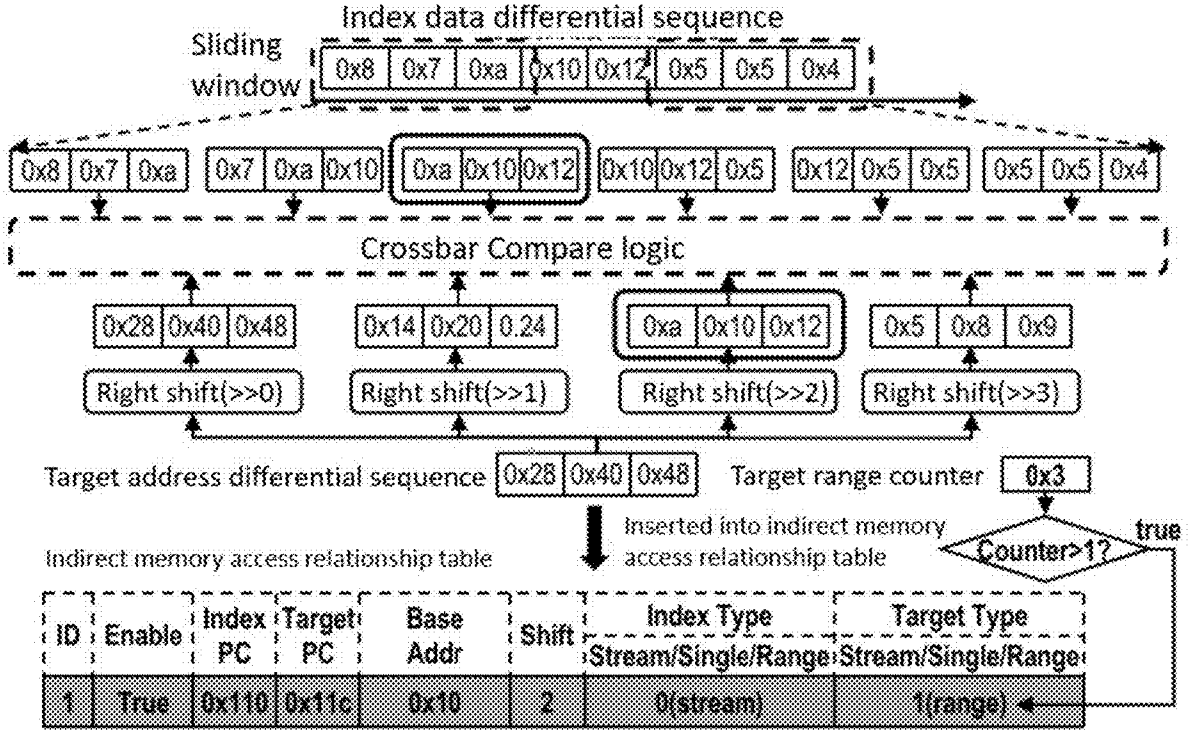
FIG. 6 is a diagram of matching of a differential sequence of index data and a differential sequence of a target address in an embodiment of the present disclosure.
FIG. 7 is a schematic structural diagram of an index queue in an embodiment of the present disclosure.
FIG. 8 is a schematic structural diagram of an indirect memory access candidate scoreboard in an embodiment of the present disclosure.

FIG. 6 shows a differential matching process of a differential sequence of index data and a differential sequence of a target address. A specific matching method is to shift the differential sequence of the target address to the right by four different bits, respectively 0, 1, 2 and 3, and compare the differential sequence of the target address after the displacement with the differential sequence of the index data in sequence, and the two comparison sequences are considered to be matched successfully if they are consistent in both value and order. Otherwise, a differential sequence window of the index data of the access index table is slid back one bit, and the comparison is performed again. A successfully matched pair of index PC value and target PC value to be matched and the corresponding related information will be stored into the indirect memory access relationship table as a successfully recognized indirect memory access relationship.

In another embodiment, as shown in FIG. 7, the index queue is a functional unit for storing a currently recognized stream access PC value and its related information, as well as an indirect memory access PC value and its related information, and each entry of the index queue is divided into three parts: an index PC value, a tried counter, and a matched counter. The main purpose of the index queue design is to support the recognition and prefetch generation of a plurality of indirect memory access modes (e.g., a total of 4 indirect memory access modes in i and ii of the previous section).

Exemplarily, with respect to the above related information, each entry of the index queue is divided into three parts: an index PC value (Index PC), a tried counter (Tried), and a matched counter (Matched). The first part, the index PC value (Index PC), stores the PC value corresponding to the stream access recognized by the stride prefetcher, as well as the indirect memory access PC value recognized by the differential matching prefetcher of the present disclosure, and the PC values of this part are given to the access index table. The second part, the tried counter (Tried), indicates the number of times the PC of the current stream access participates in the differential matching. The third part, the matched counter (Matched), indicates the number of indirect memory access PC values with which the PC value of the current stream access has been successfully matched. Whenever one piece of new stream access is recognized by the stride prefetcher or a new indirect memory access PC value is recognized by the differential matching prefetcher of the present disclosure, a new entry will be added to this unit, with both Tried and Matched initialized to 0 for this entry. This unit computes to-be-selected weights W of all table entries each time and sends the indirect memory access PC with the highest to-be-selected weight to the access index table to count a data difference and participate in the subsequent matching process.

A computing formula for the to-be-selected weights is:

$$W = \frac{\text{Matched} + 1}{\text{Tried}}$$

When Tried is 0, the value of W is infinity, and when Tried is 0, and an 8-bit unsigned fixed-point number is used to represent W, W is assigned a value 255.

In another embodiment, as shown in FIG. 8, the indirect memory access candidate scoreboard is a storage functional unit for storing information related to the candidate indirect memory access PC value that may form an indirect memory access relationship with the index PC value.

Figures 9, 10, 11, 12:
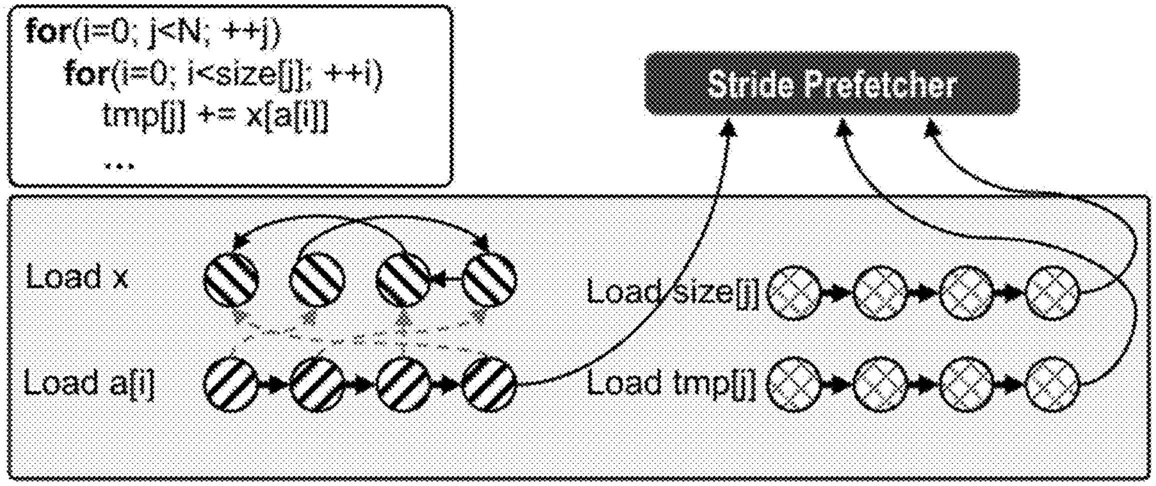
FIG. 9 is a schematic structural diagram of an indirect memory access relationship table in an embodiment of the present disclosure.
FIG. 10 is a schematic structural diagram of a prefetch status handling register in an embodiment of the present disclosure.
FIG. 11 is a schematic structural diagram of a range prefetch table in an embodiment of the present disclosure.
FIG. 12 is a schematic diagram of a set of indirect memory access relationships in an embodiment of the present disclosure.

In another embodiment, as shown in FIG. 9, the indirect memory access relationship table is a unit with a storage function for storing an indirect memory access relationship. Each table entry in the table is divided into seven parts. The first part, an enabling signal (Enable), stores flag information used for indicating whether prefetching is activated for the indirect memory access mode corresponding to the table entry. The second and third parts store the index PC value and the target PC value (i.e., the index PC value and the target PC value to be matched which are matched successfully by the above differential matching module). The fourth part, a base address (Base Addr), stores a base address corresponding to the indirect memory access relationship, which is computed after successful matching. Exemplarily, a formula for computing the base address is:

$$\text{Base } Addr = LastAddr - \left(\left(LastIdx - \sum_i IdxDiff(i)\right) \ll \text{shift}\right)$$

where LastAddr is the last monitored target address in the access target table, LastIdx is the last monitored index data in the access index table, and IdxDiff (i) is the summation of the differential sequences of the index data of the corresponding table entries in the access index table. The fifth part, a shift (Shift), stores the number of shift bits used for a successful match in the differential matching module. The number of shift bits will be used in the computation of the base address and the generation of the prefetch address.

The sixth part, index types (Index Type), and the seventh part, target types (Target Type), store the access types of the instructions corresponding to the index PC value and the target PC value in the indirect memory access relationship of this entry, and the types are divided into three types: (1) Stream, (2) Single, and (3) Range, which respectively represent (1) persistent continuous or step-by-step access, (2) indirect single-point memory access, and (3) indirect range memory access. The Stream type is recognized by the stride prefetcher, the indirect range memory access (Range) type is recognized by the continuous address filter and the range prefetch table, and the rest is categorized as the indirect single-point memory access (Single) type.

In another embodiment, the address generator is a functional unit with displacement and addition operation capabilities. This unit accepts the data returned by the access request of the index PC value monitored by a monitor, reads the base address and shift of the indirect memory access relationship corresponding to the table entry of the index PC value in the indirect memory access relationship table, and is used for computing and generating an address prediction for the indirect memory access target.

Exemplarily, a formula for computing the prefetch address is:

$$\text{Predicted Indirect Address} = \text{Indirect Base Address} + (\text{Index Valude} \ll \text{shift})$$

Wherein,

Indirect Base Address is the base address (Base Addr) stored in the corresponding table entry of the indirect memory access relationship table, Index Value is the data returned by the access request of the monitored index PC value, shift is the shift stored in the corresponding table entry of the indirect memory access relationship table, and Predicted Indirect Address is the new prefetch address generated by the computation.

The indirect memory access prefetch address generated according to the above formula will be inserted into the prefetch queue of the cache as a data prefetch request, thus realizing the function of the prefetch of the indirect memory access data.

In another embodiment, as shown in FIG. 10, the prefetch status handling register (PSHR) is a storage functional unit for storing memory access request information of the index PC value. Table entries are divided into four parts. The first part is a valid identification bit (Valid) that indicates whether the current table entry information is valid. The second part stores an ID (IRT ID) of a corresponding table entry in the indirect memory access relationship table, which is used for indexing to the corresponding table entry information in the indirect memory access relationship table. The third part is the prefetch address (Prefetch Address) generated by the corresponding table entry, and an access request generated by the address is in a state of waiting for a response from the lower level of storage hierarchy. The fourth part is a bitmap (Bitmap) consisting of a sequence of 0's and 1's, which is used for identifying which of the data from the lower-level response is useful, with 1's indicating usefulness and 0's indicating uselessness. The prefetch status handling register is mainly configured to receive the data returned from the lower level of hierarchical structure, and according to the identification data of the Bitmap, it is given to the address generator to further generate the computation of the target prefetch address.

In another embodiment, as shown in FIG. 11, the range prefetch table (PT) is a storage functional unit for storing range prefetch information. Table entries are divided into four parts. The first part is the serial number ID (IRT ID) of the corresponding table entry of the indirect memory access relationship table, which corresponds to a certain recognized indirect memory access relationship. The second part is the sample counter, which records the total sample counter (Sample Counter) during the range value sampling statistics of the indirect memory access relationship. The third part is a distribution of sampled range values (Sampled Range), which contains 9 counters respectively representing the number of times the range values are sampled in 1-2, 3-4, 5-6, 7-8, 9-10, 11-12, 13-14, 15-16, and greater than 16. The fourth part is a predicted range value (Predicted Range), i.e., an entry with the largest sample counter is selected as the predicted range counter according to the distribution of the sampling situation and is used in the subsequent prefetch generation phase. Whenever an indirect memory access relationship is recognized, a table entry of the range prefetch table is created, the access addresses associated with the target PC value are counted by the continuous address filter module, the object of statistics is the length of the continuous address access generated by the target PC value, and 1 is added to the counter corresponding to the third entry according to the length. After the total sample counter (Sample Counter) reaches the configured threshold, sampling ends, and the range with the largest number of times of statistics in the sampling range division is selected as the predicted range value. The threshold of the total sample counter is a configurable parameter.

Figure 13:
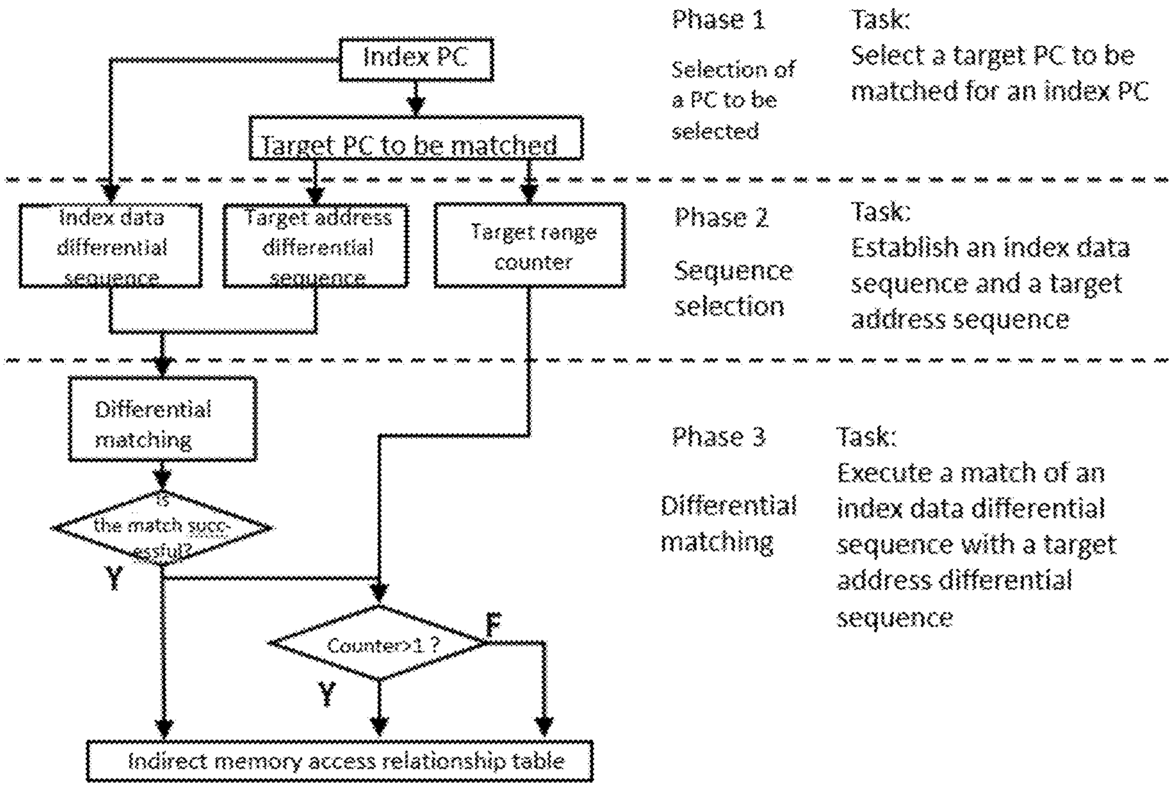
FIG. 13 is a schematic diagram of a recognition process of an indirect memory access relationship in an embodiment of the present disclosure.
Figure 14:
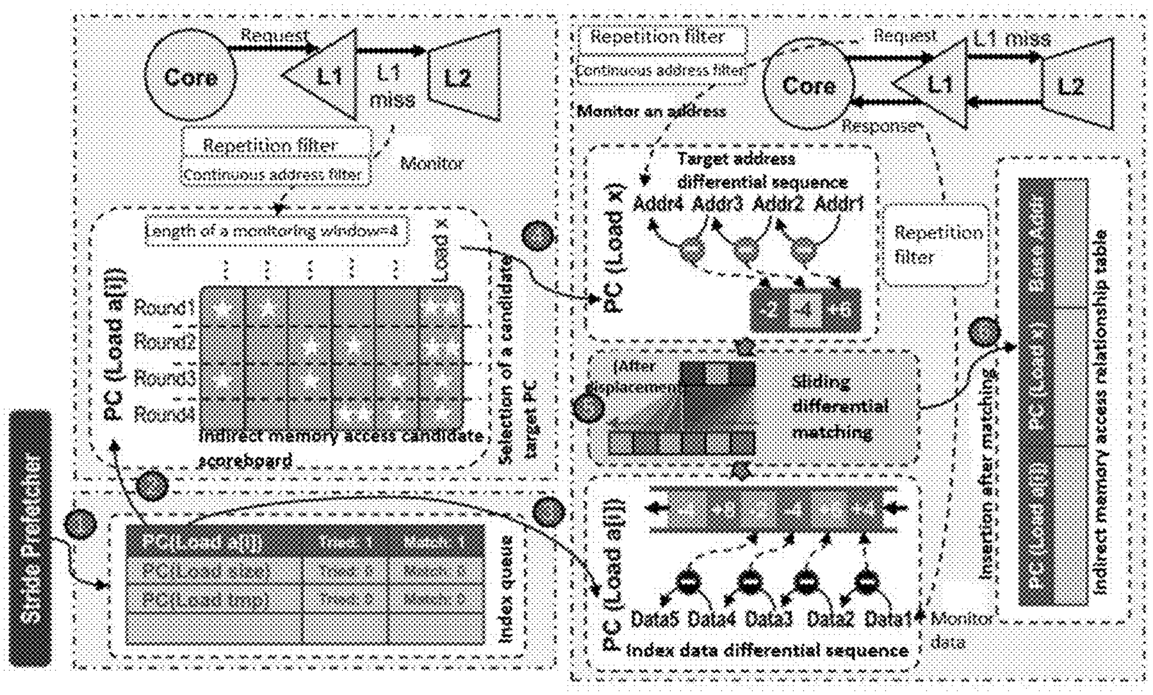
FIG. 14 is a schematic diagram of a recognition process of a set of indirect memory access relationships in an embodiment of the present disclosure.

In another embodiment, FIG. 12, FIG. 13, and FIG. 14 show a process of recognizing a set of indirect memory access relationships by the differential matching prefetcher (DMP) of the present disclosure. In this embodiment, a core run code includes stream access to the array a and indirect memory access to the array x, which together form a set of indirect memory access relationships. In addition, access to arrays tmp and size are just stream access.

1. Recognition of an Indirect Memory Access Mode—Phase 1

After the code starts executing, the stream access to the arrays a, tmp, and size will be captured by the stride prefetcher, and their corresponding access instruction PC values will be inserted into the index queue, corresponding to ① in FIG. 14. The index queue computes the weight of the PC value of each table entry according to Tried and Matched in the table entry, and selects the corresponding PC value in the table entry with the largest weight as the index PC value to be given to the indirect memory access candidate scoreboard. In this embodiment, the index queue selects the PC value corresponding to Load a[i] as the index PC value for the first time and increases Tried of the corresponding table entry from 0 to 1.

Figure 15:
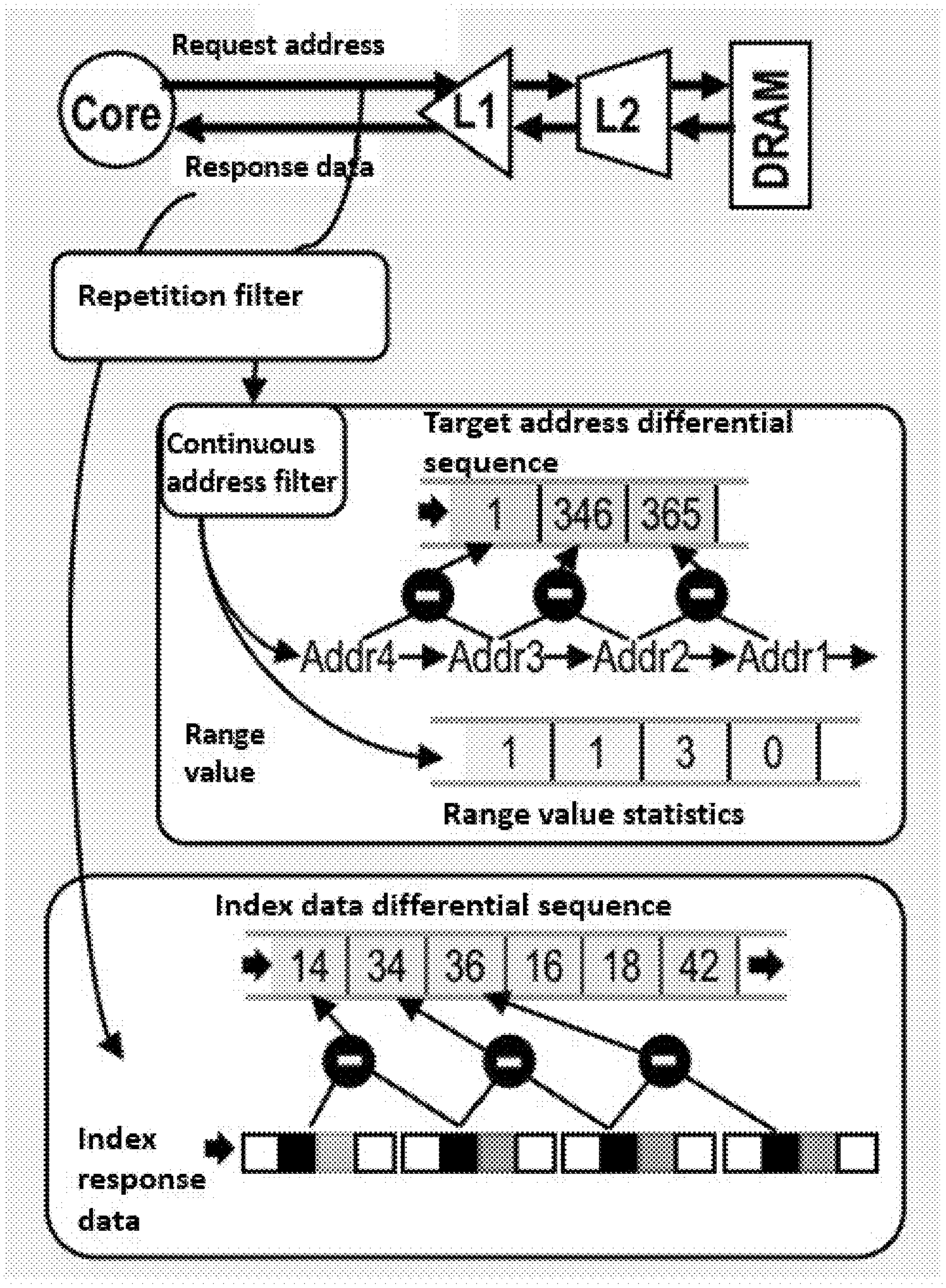
FIG. 15 is a schematic diagram of generating a differential sequence of index data and a differential sequence of a target address in an embodiment of the present disclosure.

2. Recognition of the Indirect Memory Access Mode—Phase 2:

on the one hand, a new table entry is added to the access index table, and the index PC value of the table entry is the PC value (Load a[i]) selected in phase 1. The access request response data sent from the first level of cache to the CPU is started to be monitored, and the monitored response data of the index PC value is used for continuously updating the last monitored index data (Last Index) of the corresponding table entry, which corresponds to ③ in FIG. 14. On the other hand, a new table entry is added to the indirect memory access candidate scoreboard, the index PC value of the table entry is the PC value selected in phase 1, and the statistics of the PC value of the source access instruction of the cache miss request is started, corresponding to ② in FIG. 14. In this embodiment, a total of 4 rounds of sampling are performed, and the size of the sampling window is 4, i.e., each round of sampling counts the access instruction PC values of the 4 cache miss requests after the current index PC value corresponds to the access request. These PC values will exist as candidate target PC values in the current table entry. When the 4 rounds of sampling are completed, the candidate indirect memory access PC value with the highest number of misses in the entries of the indirect memory access candidate scoreboard will be given to the access target table as the target PC value to be matched. In this embodiment, the indirect memory access candidate scoreboard in FIG. 14 shows the situation of 4 rounds of cache misses each time PC (Load a[i]) generates an access request to L2 Cache, wherein the counter of miss requests related to PC (Load x) is counted to be 2+2+1+1=6, and the total number of miss requests is 16. PC (Load x) occupies the highest number of miss requests among all the counted miss PCs, so the indirect memory access candidate scoreboard gives PC (Load x) as a target PC value to be matched to the subsequent access target table. The access target table creates a new table entry according to the sent target PC value to be matched, and monitoring the memory access request target address sent by the CPU to the first level of cache is started. The monitored target address is filtered by the repetition filter module and the continuous address filter module, while the range value sampling corresponding to the current target PC value to be matched is provided by the continuous address filter module to the range prefetch table. The last monitored target address (Last Addr) of the corresponding table entry is continuously updated by the monitored target address corresponding to the target PC value to be matched, and meanwhile a target address differential sequence is generated, corresponding to ④ in FIG. 14. FIG. 15 shows a process of generating the index data differential sequence and the target address differential sequence through the repetition filter and the continuous address filter.

3, Recognition of the Indirect Memory Access Mode—Phase 3:

After the target address differential sequence of a table entry in the access target table is filled (the length of the differential sequence is 3 in this embodiment), the corresponding target address differential sequence is sent to the differential matching module, and the index data differential sequence corresponding to the index PC values in the table entries of the indirect memory access candidate scoreboard (monitored and recorded by the index target table) is subjected to a sliding match after a shift, corresponding to ⑤ in FIG. 14. In this embodiment, the address difference length of the access target table is 3. The target address differential sequence counted by PC (Load x) is −2, −4, +6. The index data differential sequence counted by PC (Load a[i]) in the access index table is −4, +8, −2, −4, +6, +4. At this time, when the number of shift bits is 0, the third to fifth items of the index data differential sequence completely overlap with the target address differential sequence of PC (Load x), and it is regarded as a successful match between the PC (Load a[i]) value and the PC (Load x) value.

After successful matching, a new table entry is created in the indirect memory access relationship table. The base address and shift in the table entry are computed from the information previously counted, corresponding to ⑥ in FIG. 14. The specific information and providing modules are: the index PC value, the last monitored index data, and the index data differential sequence are provided by the access index table, the target PC value, and the last monitored target address are provided by the access target table, the successful matching position, and the shift used for successful matching are provided by the differential matching module, and the index type, and the target type are provided by the range prefetch table. This table entry corresponds to a new set of indirect memory access relationships. If the indirect memory access relationship is of the type of indirect range memory access (Range), it accepts a range value sampled and selected by the range prefetch table. The range value is, when the sample counter in the range prefetch table reaches a preset value, the range value corresponding to the entry with the largest counter in the sample range and is involved in the subsequent range prefetch generation.

In the index queue, Matched is increased from 0 to 1 in the table entry corresponding to Load a[i], and the next selected PC value will be PC (Load size [j]). The table entry corresponding to the successfully matched indirect memory access is cleared in the access target table, i.e., the relevant table entry of PC (Load x) in the access target table will be eliminated. The target PC value in the newly added indirect memory access relationship will be inserted into the index queue as a new PC value to realize the recognition of possible multi-level indirect memory access. At this point, the recognition of a set of indirect memory access modes is completed.

4. Prefetch Generation of Indirect Memory Access

For the indirect memory access relationship recognized in the indirect memory access relationship table, the indirect memory access relationship table monitors a response data cache block returned from the lower level of structure to the current cache MSHR, and at the same time compares the access address retained in the MSHR with the prefetch address in the prefetch status handling register (PSHR). A successful comparison and a valid identification bit of the corresponding entry in the PSHR with a valid status indicate that the indirect memory access relationship table may prefetch one piece of indirect memory access using this response data cache block. This indirect memory access relationship is indexed in the indirect memory access relationship table by an IRT ID entry in the PSHR. A representation of the indexed indirect memory access relationship and the response data cache block at this point will be sent to the address generator.

The address generator computes the indirect memory access address that needs to be prefetched according to the indirect memory access base address and shift in the corresponding table entry of the indirect memory access relationship table and the sent response data, and inserts the indirect memory access address into the prefetch queue, thereby realizing the prefetch of the indirect memory access. If the index type in the entry of the indirect memory access relationship table is the type of indirect range memory access (Range), the corresponding table entry of the range prefetch table is queried according to the range prefetch table ID in the table entry, and range prefetch is performed according to the predicted range given by the range prefetch table. The specific behavior is that the address of the prefetch request is computed with the base address and shift for every shift byte length in the response data cache block until the current number of prefetch requests reaches the range value in the table entry. If there is a competition between the prefetch of the indirect memory access relationship and the prefetch of the stride prefetcher, the prefetch of the stride prefetcher is prioritized.

Figure 16:
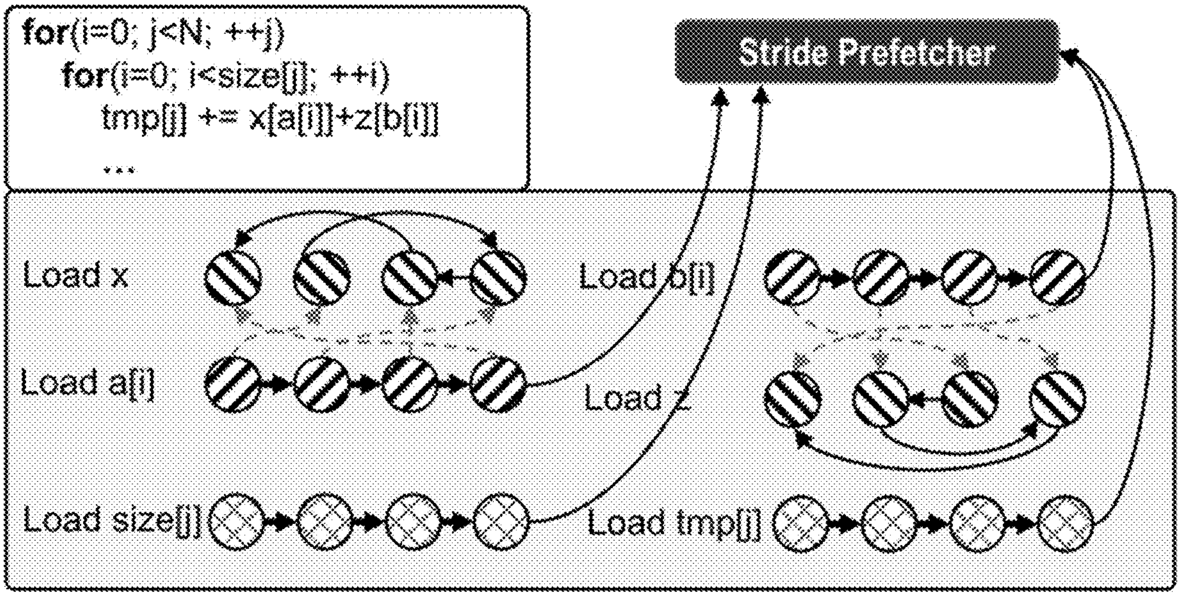
FIG. 16 is a schematic diagram of two different sets of indirect memory access relationships in an embodiment of the present disclosure.
Figure 17:
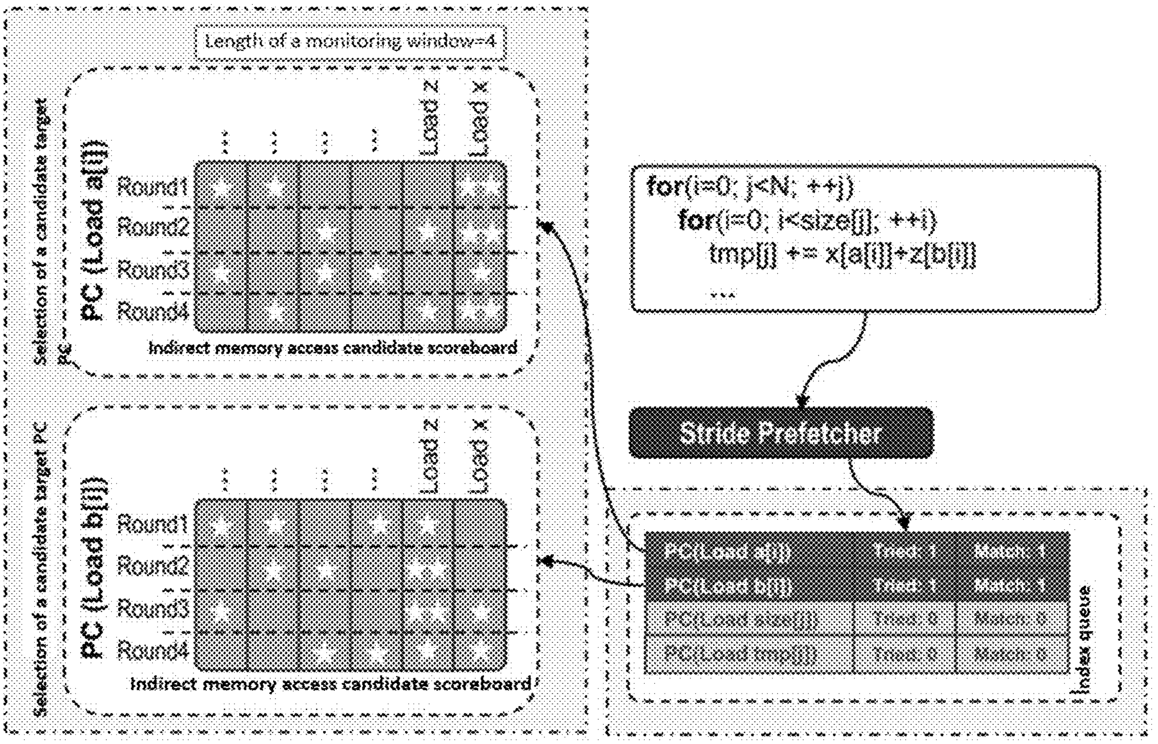
FIG. 17 is a schematic diagram of selection of a candidate target PC value under two different sets of indirect memory access relationships in an embodiment of the present disclosure.
Figure 18:
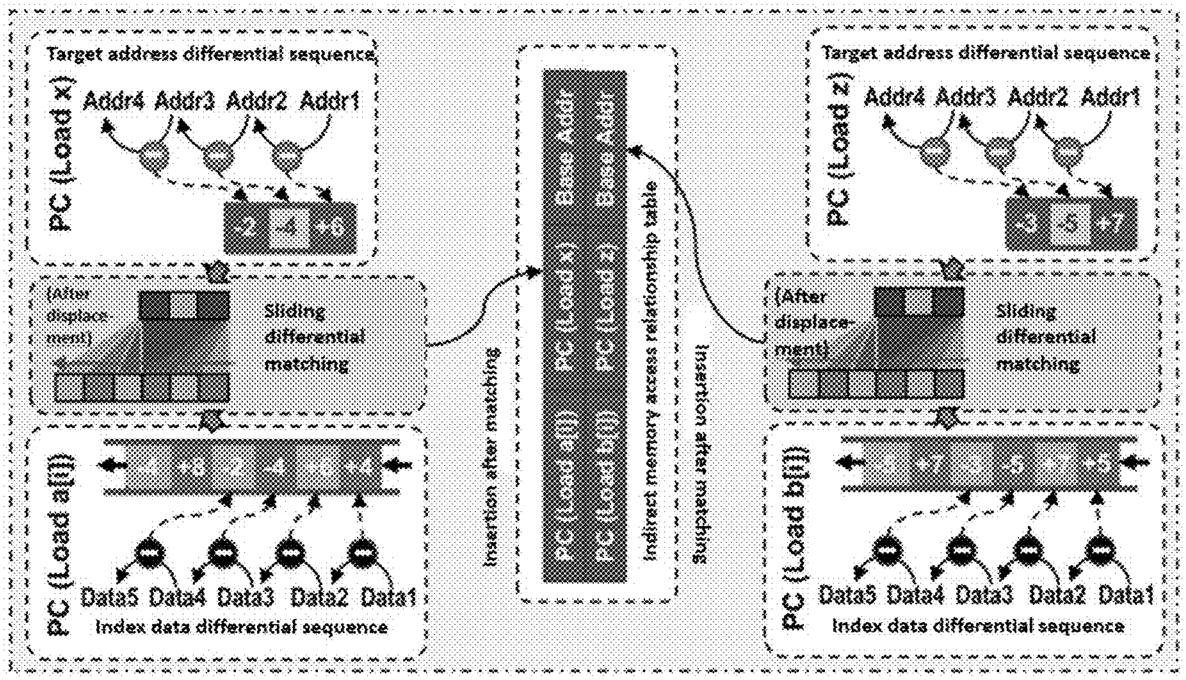
FIG. 18 is a schematic diagram of differential matching under two different sets of indirect memory access relationships in an embodiment of the present disclosure.

In another embodiment, FIG. 16, FIG. 17, and FIG. 18 show a process of recognizing two different sets of indirect memory access relationships by the differential matching prefetcher (DMP) of the present disclosure. In this embodiment, a core run code includes: stream access to the array a and indirect memory access to the array x, which are together used as a set of indirect memory access relationships, as well as stream access to an array b and indirect memory access to the array z, which are together used as a set of indirect memory access relationships. In addition to these two sets of indirect memory access relationships, access to the arrays tmp and size is stream access.

1. Recognition of the Indirect Memory Access Mode—Phase 1:

The recognition of two sets of indirect memory access relationships builds on basis of recognition of a set of indirect memory access modes. After the index queue sends Load a[i] to the indirect memory access candidate scoreboard and the access index table, Tried of the corresponding entry is increased to 1. At this point, the selection weight of this entry is lower than that of Load b[i], and at the next moment, the operation on Load a[i] will be repeated for Load b[i].

The indirect memory access candidate scoreboard will perform two sampling processes at the same time, triggered by a cache access request to the array a and a cache access request to the array b respectively. In this embodiment, the same 4 rounds of sampling are performed, and the size of the sampling window for each round is 4. After sampling is completed, the candidate target PC values are sequentially sent to the access target table as the PC values to be matched for monitoring and recording the target address differential sequence according to the order of the weights to be selected of the corresponding table entries of the indirect memory access candidate scoreboard from large to small. FIG. 17 shows the sampling situation of cache miss requests of candidate target PC values. Sampling of the cache miss requests triggered by PC (Load a[i]) and PC (Load b[i]) by the indirect memory access candidate scoreboard will be performed simultaneously. At the end of the 4 rounds of sampling triggered by PC (Load a[i]), the number of caches miss due to PC (Load x) is 2+2+1+2=7, the number of cache misses due to PC (Load z) is 0+1+0+1=2, and the total counted number of cache misses is 16. The PC (Load x) results in the largest percentage of cache misses compared to the other PCs, and will be the first to be sent by the indirect memory access candidate scoreboard to the access target table for monitoring and recording the target address differential sequence. On the other side, at the end of the 4 rounds of sampling triggered by PC (Load b[i]), the number of cache misses due to PC (Load x) is 0+0+1+1=2, the number of cache misses due to PC (Load z) is 1+2+2+1=6, and the total counted number of cache misses is 16. The PC (Load z) results in the largest percentage of cache misses compared to the other PCs, and will be the first to be sent by the indirect memory access candidate scoreboard to the access target table for monitoring and recording the target address differential sequence.

2. Recognition of the Indirect Memory Access Mode—Phase 2:

After the target address passes through the repetition filter and continuous address filter modules, the target address differential sequence is monitored and recorded in the access target table. After each target address differential sequence of the access target table is recorded, a sliding match is made with the index data differential sequence corresponding to the index PC value in the access index table.

3. Recognition of the Indirect Memory Access Mode—Phase 3:

FIG. 18 shows the situation of sliding differential matching in this embodiment. In the access target table, the target address differential sequence of PC (Load x) is −2, −4, −6, and the target address differential sequence of PC (Load z) is −3, −5, +7. In the access index table, the index data differential sequence of PC (Load a[i]) is −4, +8, −2, −4, +6, +4, wherein when the number of shift bits is 0, the third item to the fifth item coincide exactly with the target address differential sequence of PC (Load x) in the access target table, and the match is regarded as successful. The index data differential sequence of PC (Load b[i]) is −5, +7, −3, −5, +7, +5, wherein when the number of shift bits is 0, the third item to the fifth item coincide exactly with the target address differential sequence of PC (Load z) in the access target table, and the match is regarded as successful. Together with the two index PC values, i.e., PC (Load a[i]) and PC (Load b[i]), and the successfully matched target PC values, i.e., PC (Load x) and PC (Load z), the indirect memory access relationship information (i.e., the number of address difference shift bits, the base address of the indirect memory access, etc.) obtained from differential matching is inserted into the indirect memory access relationship table as two newly recognized indirect memory access relationships. Meanwhile, in the index queue, Matched in the table entries corresponding to Load a[i] and Load b[i] is increased from 0 to 1, the weight thereof selected to be given to the indirect memory access candidate scoreboard will be decreased, and the next selected PC value will be PC (Load size [j]). The table entries about PC (Load x) and PC (Load z) in the access target table will be eliminated. At this point, the recognition of the two different sets of indirect memory access relationships is completed.

4. Prefetch Generation of the Indirect Memory Access Mode:

The prefetch process for two different sets of indirect memory access relationships is the same in flow as the prefetch generation for one set of indirect memory access relationships. The difference is that multi-way indirect memory access relationships need to simultaneously generate their respective corresponding prefetch addresses during each prefetch generation cycle and insert them into the prefetch queue.

Figure 19:
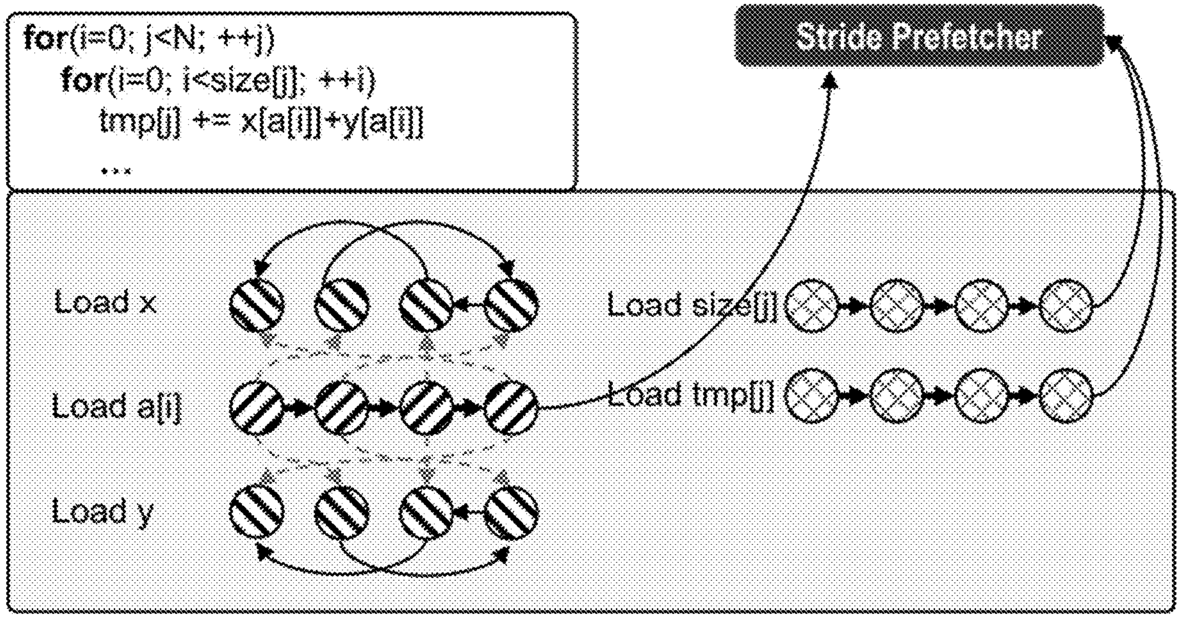
FIG. 19 is a schematic diagram of two sets of indirect memory access relationships containing the same index PC value in an embodiment of the present disclosure.
Figure 20:
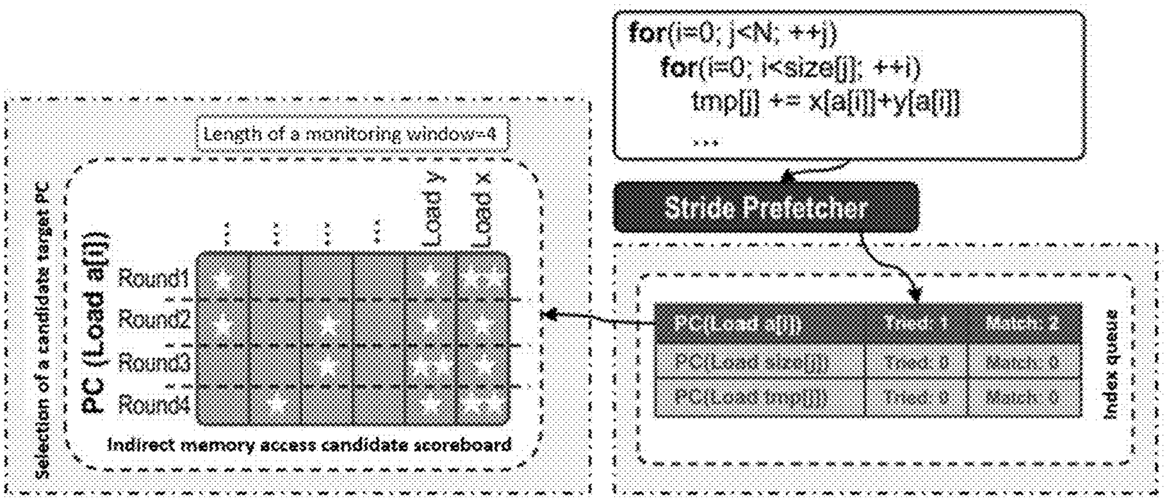
FIG. 20 is a schematic diagram of selection of a candidate target PC value of two sets of indirect memory access relationships containing the same index PC value in an embodiment of the present disclosure.
Figure 21:
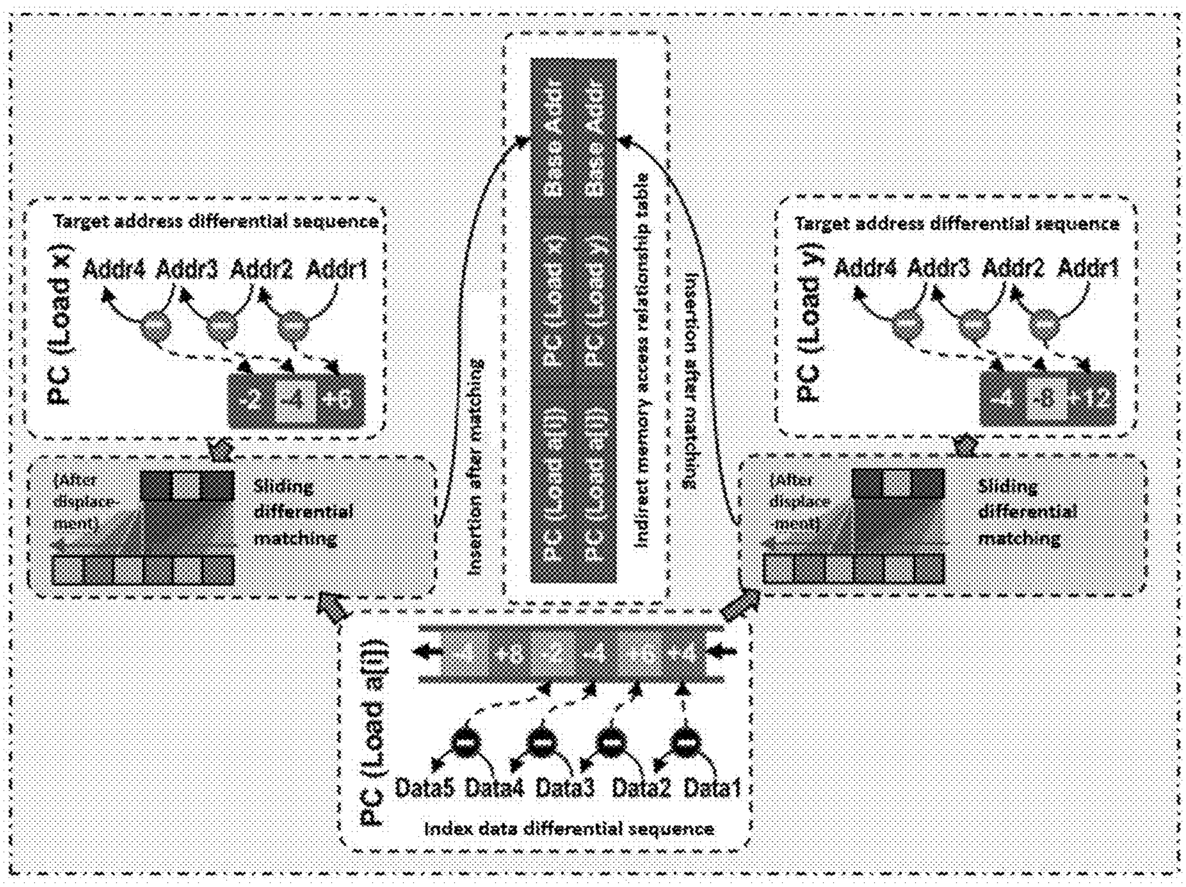
FIG. 21 is a schematic diagram of differential matching of two sets of indirect memory access relationships containing the same index PC value in an embodiment of the present disclosure.

In another embodiment, FIG. 19, FIG. 20, and FIG. 21 show the process of recognizing two sets of indirect memory access relationships containing the same index PC value by the differential matching prefetcher (DMP) of the present disclosure. In this embodiment, a core run code includes: stream access to the array a and indirect memory access to the array x, which are together used as a set of indirect memory access relationships, as well as stream access to the array a and indirect memory access to the array y, which are together used as a set of indirect memory access relationships. The two sets of indirect memory access relationships share one index PC value. In addition, access to arrays tmp and size is stream access.

1. Recognition of the Indirect Memory Access Mode—Phase 1:

After the code starts executing, the stream access to the arrays a, tmp, and size will be captured by the stride prefetcher, and their corresponding access instruction PC values will be inserted into the index queue. The index queue sends the PC value corresponding to Load a[i] as the index PC value to the indirect memory access candidate scoreboard to start monitoring the candidate target PC value and counting the corresponding cache miss requests, and meanwhile to the access index table for monitoring and recording the index data differential sequence. The index queue increases Tried in the table entry corresponding to this PC value from 0 to 1. The candidate target PC values monitored by the indirect memory access candidate scoreboard include the access instruction PC value for the array x and the access instruction PC value for the array y, and the number of cache misses generated by the memory access request corresponding to these two PC values is sampled and counted. Memory access requests of memory access instructions corresponding to different index PC values trigger their respective simultaneous sampling processes. At the end of each sampling process, the candidate target PC value with the largest number of cache misses is sent to the access target table as the target PC value to be matched for monitoring and recording the target address differential sequence. FIG. 20 shows the memory access instruction corresponding to PC (Load a[i]) triggering 4 rounds of cache miss sampling processes to the access request of the cache, and sampling results in this embodiment. The number of cache miss requests due to C (Load x) is 2+1+1+2=6, the number of cache miss requests due to PC (Load y) is 1+1+2+1=5, and the total counted number of cache misses is 16. Sampling and counting of these two candidate target PC values are performed within the same sampling window. This sampling window is established after the generated memory access request of the memory access instruction corresponding to PC (Load a[i]). The sampling results in this embodiment show that PC (Load x) causes the highest number of cache misses and PC (Load y) causes the second highest number of cache misses. Therefore, the indirect memory access candidate scoreboard will successively send the two candidate target PC values to the access target table for monitoring and recording the target address differential sequence.

2. Recognition of the Indirect Memory Access Mode—Phase 2:

the process of monitoring and recording target address differential sequences and index data differential sequences for two different sets of indirect memory access relationships by the differential matching prefetcher (DMP) of the present disclosure is the same as the process of recognizing a set of indirect memory access relationships.

3. Recognition of the Indirect Memory Access Mode—Phase 3:

after the access target table finishes monitoring and recording of the target address differential sequences corresponding to the two candidate target PC values, both of the obtained target address differential sequences will be matched with the index data differential sequences in the access index table in a sliding differential manner. In this embodiment, the index PC value is PC (Load a[i]), and FIG. 21 shows the specific matching process. The index data differential sequence corresponding to PC (Load a[i]) in the access index table is −4, +8, −2, −4, +6, +4. The target address differential sequence corresponding to PC (Load x) in the access target table is −2, −4, +6, when the number of shift bits is 0, it completely coincides with the third to fifth items of the index data differential sequence corresponding to PC (Load a[i]), and the two are regarded as a successful match. The target address differential sequence corresponding to PC (Load y) is −4, −8, +12, when the number of shift bits is 1, it completely coincides with the third to fifth items of the index data differential sequence corresponding to PC (Load a[i]), and the two are regarded as a successful match. PC (Load x) and PC (Load a[i]) as well as PC (Load y) and PC (Load a[i]) after successful matching will be recognized as two different sets of index PC values and target PC values, which, together with the base address, shift, and other information obtained in the process of differential matching, form two different sets of indirect memory access relationships, and are successively inserted into the indirect memory access relationship table. Then, in the index queue, Matched in the table entry corresponding to Load a[i] is increased from 0 to 2, the weight thereof selected by the indirect memory access candidate scoreboard will be decreased, and the next selected PC value will be PC (Load size [j]). The table entries corresponding to PC (Load x) and PC (Load y) in the access target table will be eliminated. At this point, the recognition of two sets of indirect memory access relationships containing the same index PC value is completed.

4. Prefetch Generation of the Indirect Memory Access Mode:

In this embodiment, the prefetch process of the differential matching prefetcher (DMP) of the present disclosure for two sets of indirect memory access relationships containing the same index PC value after successful recognition as described above is the same as the prefetch process in the process of recognizing two different sets of indirect memory access modes.

Figure 22:
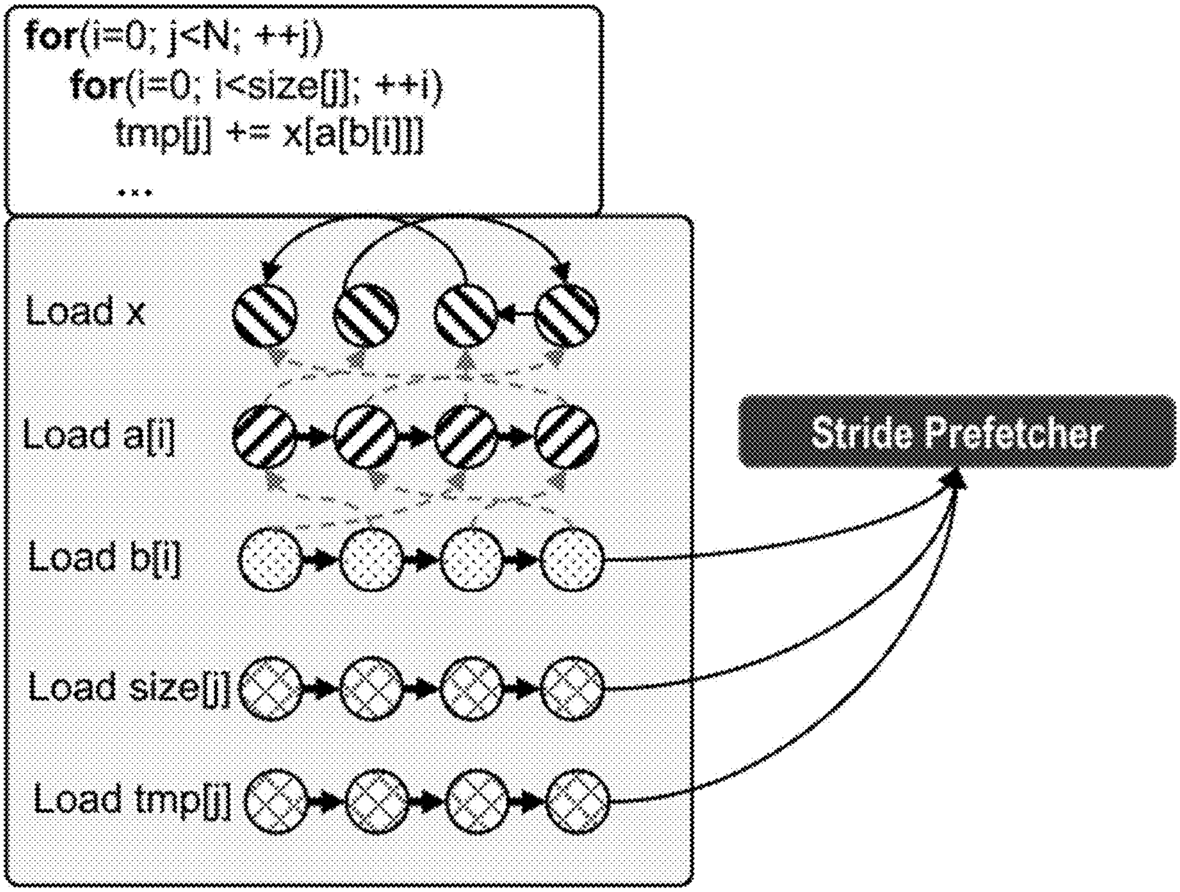
FIG. 22 is a schematic diagram of a two-level indirect memory access relationship in an embodiment of the present disclosure.
Figure 23:
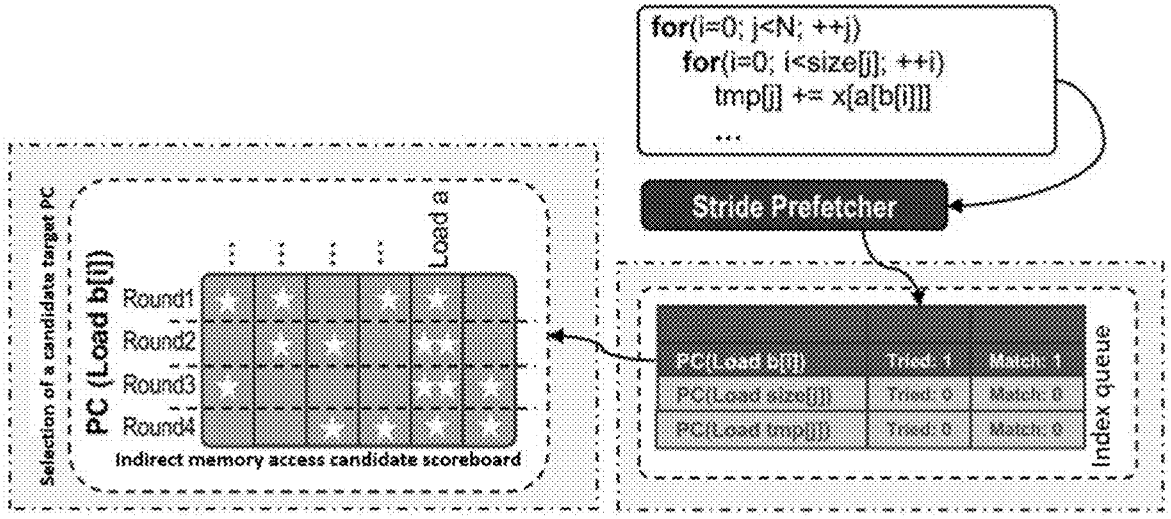
FIG. 23 is a schematic diagram of selection of a candidate target PC value of a two-level indirect memory access relationship in an embodiment of the present disclosure.

In another embodiment, FIG. 22, FIG. 23, and FIG. 24 show a process of recognizing two-level indirect memory access relationships by the differential matching prefetcher (DMP) of the present disclosure. In this embodiment, a core run code includes: stream access to the array b and indirect memory access to the array a, which are together used as a set of indirect memory access relationships, as well as indirect memory access to the array a and indirect memory access to x, which are together used as a set of indirect memory access relationships. These two sets of indirect memory access relationships are relayed by the indirect memory access to the array a and show a dependency relationship. Namely, the PC value of the access instruction to the array a serves as both the target PC value and the index PC value of these two sets of indirect memory access modes. In addition, access to arrays tmp and size is stream access.

After the code starts executing, the differential matching prefetcher (DMP) of the present disclosure first goes through a process of recognizing a set of indirect memory access relationships, the specific process of which may refer to the preceding embodiment. In this embodiment, the DMP first recognizes a set of indirect memory access relationships with a stream access instruction to the array b as the index PC value and indirect memory access to the array a as the target PC value. After completing the recognition of the first set of indirect memory access relationships, the first set of recognized target PC values will be inserted into the index queue, i.e., PC (Load a) will be used as the index PC value of the new table entry in the index queue to try to perform a second level of sampling and counting of the candidate PC values. This process is the same as the recognition process of the DMP for a set of indirect memory access relationships. After the final round of sampling, the indirect memory access candidate scoreboard selects PC (Load x) as a candidate target PC value to be sent to the access target table. A new corresponding table entry is added to the access target table to monitor the access address corresponding to the candidate target PC value. The access address forms a target address differential sequence after passing through the repetition filter module and the continuous address filter module. The differential matching module performs a sliding differential match on the index data differential sequence of PC (Load a) and the target address differential sequence of PC (Load x). In this embodiment, the two match successfully. At this point, the second set of newly recognized indirect memory access relationships is inserted into the indirect memory access relationship table. At this point, in the case of two levels of indirect memory access, two sets of indirect memory access relationships with dependencies are correctly recognized.

The prefetch generation process after the two sets of indirect memory access relationships contained in the case of the two-level indirect memory access relationships are recognized is the same as the prefetch generation process of the DMP for two different sets of indirect memory access relationships, and the prefetch generation process of the DMP for two indirect memory access relationships containing the same index PC value.

Figure 26:
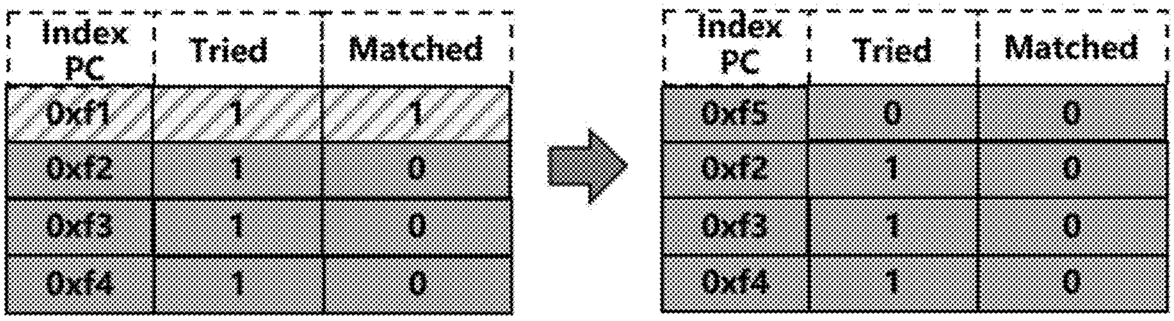
FIG. 26 is a schematic diagram of a fifth recognized stream access PC value or a recognized indirect memory access PC value inserted into an index queue in an embodiment of the present disclosure.

In another embodiment, FIG. 25 and FIG. 26 show a situation in which the differential matching prefetcher (DMP) of the present disclosure handles the need to insert a new PC value table entry when the index queue capacity is full. In this embodiment, the core run code includes five pieces of stream access (with PC values being 0xf0, 0xf2, 0xf3, 0xf4, and 0xf5 correspondingly and respectively) and one piece of indirect memory access, with the PC value correspondingly being PC (Load x). The stream access to the array a and indirect memory access to the array x form a set of indirect memory access relationships, and the remaining stream access does not participate in any set of indirect memory access relationships. In this embodiment, the capacities of the index queue and the access index table are set to 4.

After the code starts executing, the first 4 pieces of stream access are captured by the stride prefetcher. The PC value of its access instruction is added to the index queue. At the same time, the process of recognizing the indirect memory access relationship is synchronized, the specific process of which may be seen in the preceding embodiment. When the indirect memory access candidate scoreboard finishes selecting the candidate target PC value of the fourth piece of stream access, the situation of the index queue is shown in a table on the left side of FIG. 26. At this point, the stride prefetcher captures the fifth piece of stream access, and the new PC value needs to be inserted into the index queue. The index queue uses a first-in-first-out update mechanism. When the capacity is full, the index queue selects the table entry that is currently the earliest entry into the index queue to be overwritten by a new table entry. In this embodiment, the table entry corresponding to the PC value 0xf1 in the index queue is overwritten by the newly entering table entry corresponding to the PC value 0xf5. The overwriting update mechanism of the access index table is the same, i.e., the earliest entering table entry is selected to be overwritten by the newly entering table entry.

Figure 27:
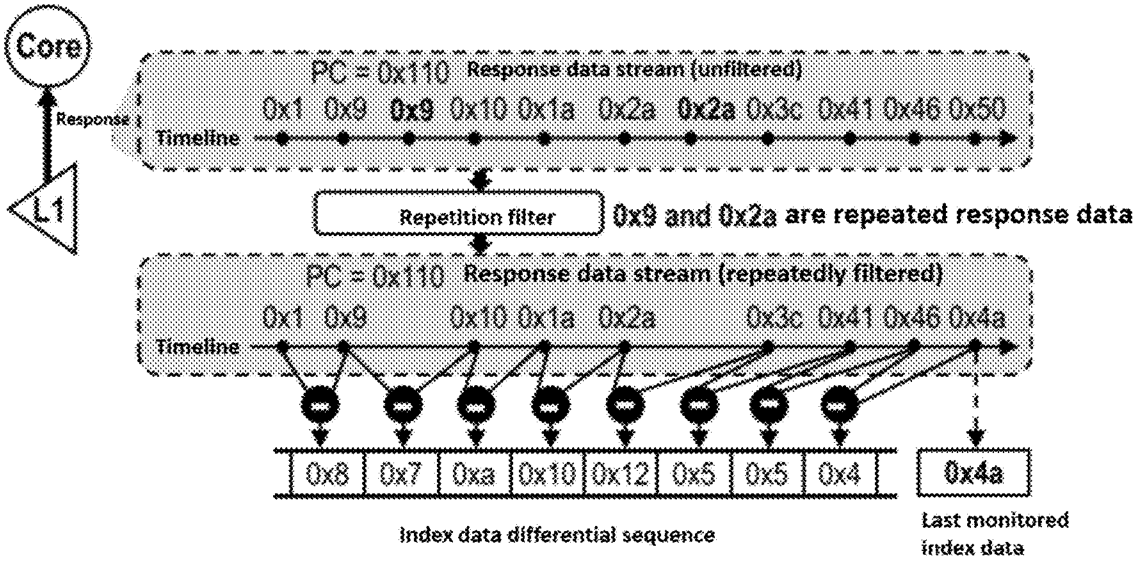
FIG. 27 is a schematic diagram of a repetition filter filtering a response data stream in an embodiment of the present disclosure.
Figure 28:
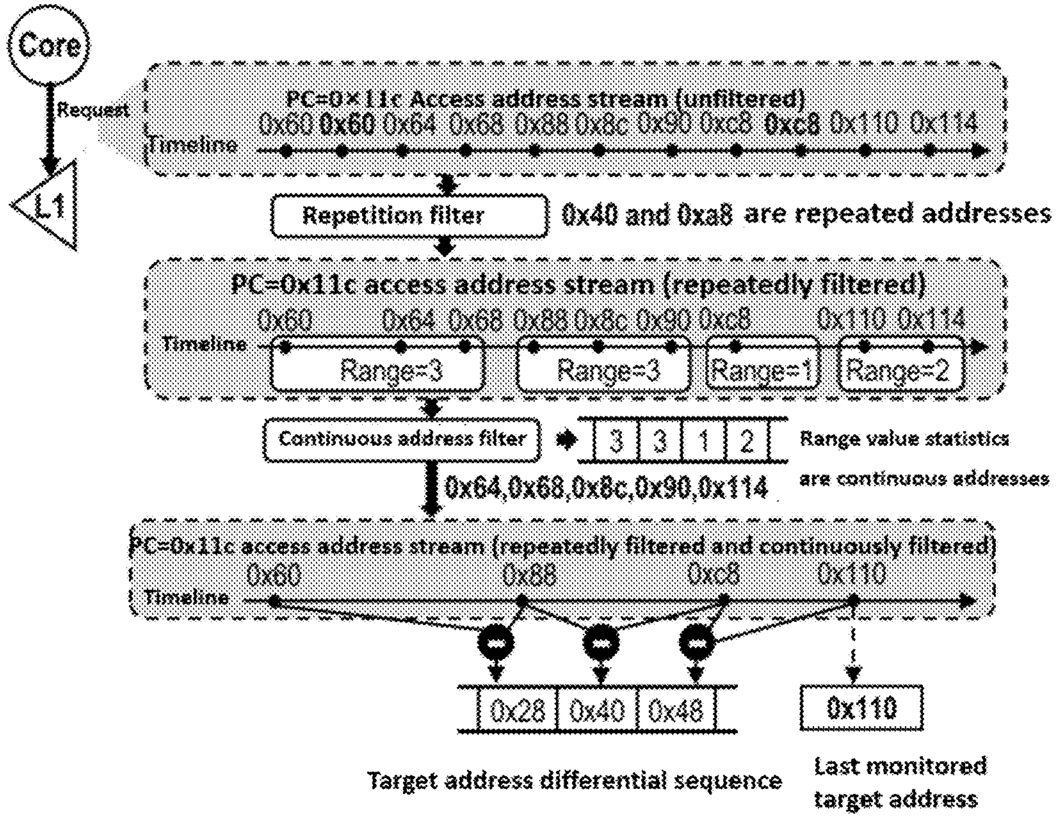
FIG. 28 is a schematic diagram of a repetition filter and a continuous address filter filtering a request address stream in an embodiment of the present disclosure.

In another embodiment, FIG. 27 and FIG. 28 show filtering functions of the repetition filter for response data from the first level of cache to the CPU and the request address from the CPU to the first level of cache respectively. A speculation mechanism exists in a modern out-of-order multi-transmission CPU, e.g., predicting early execution for a branch jump direction. The speculation of the memory access instruction causes the address request and response data between the CPU and the first level of cache to be repeated. The former of the repetitive case is the request or response resulting from the speculation of the instruction, and when the speculation is later proven to be incorrect, a pipeline flush is performed and the same memory access instruction is executed again, resulting in the latter request or response in the repetitive case. The repetition filter can filter the adjacent repetitive items in the request address stream and response data stream, thus avoiding the CPU speculation mechanism from interfering with the establishment of the differential sequence, and improving the accuracy of the recognition of the indirect memory access relationship.

In another embodiment, FIG. 28 shows a filtering function of the continuous address filter for the request address stream. The instruction with a PC value of 0x11c is continuously accessing data on different addresses. Continuous access address requests in the access address are captured and filtered by the continuous address filter, and meanwhile the length of each set of continuous address request access is counted and recorded as a one-time sampling result in the range prefetch table. The sampling result will participate in the process of selecting the range values in the type of indirect range memory access (Range) after the sampling of the corresponding table entries of the range prefetch table is completed. The access address stream after filtering retains the first access address of each set of continuous address requests, and subsequent request addresses do not participate in monitoring and recording target address differential sequences in the access target table. The purpose of the continuous address filter is to prevent accesses of the type of indirect range memory access (Range) from having an impact on the recognition of the indirect memory access relationship, while using a sampling and counting method to select the range values to improve coverage of prefetching of the type of indirect range memory access (Range).

Figure 29:
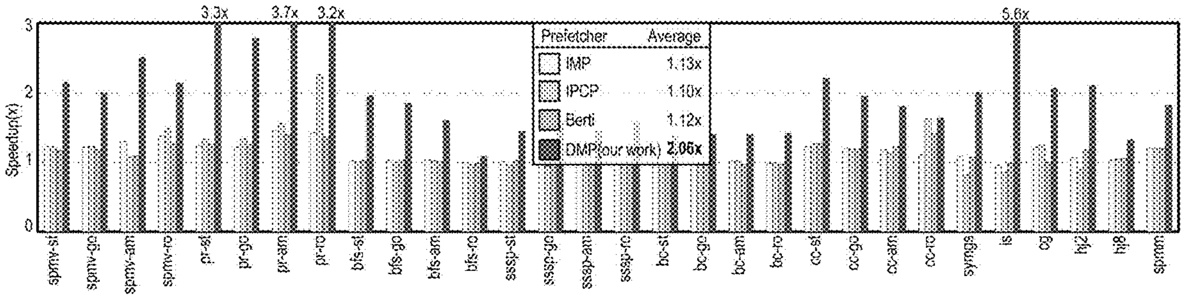
FIG. 29 is a diagram of a performance comparison of a differential matching prefetcher (DMP) disclosed in the present disclosure to other currently available hardware data prefetchers in an embodiment of the present disclosure.

In another embodiment, FIG. 29 shows a diagram of a performance comparison of the differential matching prefetcher (DMP) of the present disclosure to other current hardware differential matching prefetchers. The hardware differential matching prefetchers are differential matching prefetchers that are directly implemented in circuits to work without the cooperation of software, such as an indirect memory prefetcher (IMP), instruction pointer classifier based spatial prefetching (IPCP), and Berti. A performance comparison result shows that with configurations of different test operators and different test input matrixes, compared to the baseline without any differential matching prefetching, the differential matching prefetcher (DMP) of the present disclosure can achieve an average of 2.06× acceleration performance, and a maximum of 5.6× acceleration performance, which is significantly better than 1.13× acceleration performance of the IMP, 1.10× acceleration performance of the IPCP, and 1.12× acceleration performance of the Berti.

Figure 30:
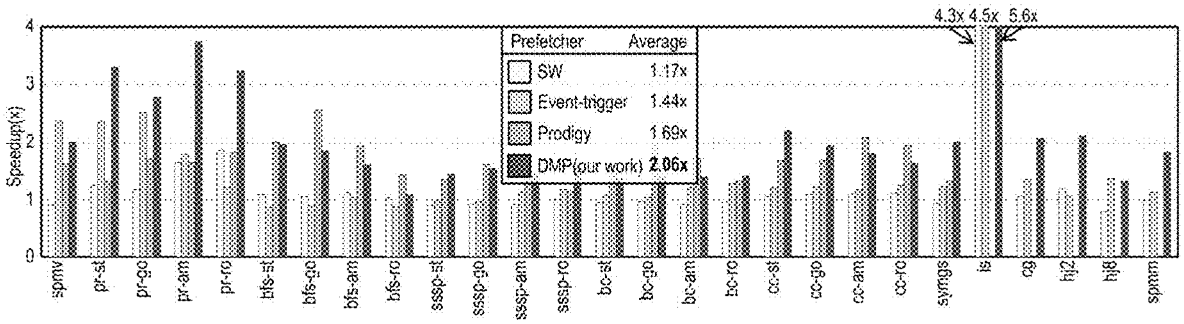
FIG. 30 is a diagram of a performance comparison of a differential matching prefetcher (DMP) disclosed in the present disclosure to a currently available data prefetching solution involving software.

In another embodiment, FIG. 30 shows a diagram of a performance comparison of the differential matching prefetcher (DMP) of the present disclosure to a currently available differential matching prefetching solution involving software. The differential matching prefetching solution involving the software is a differential matching prefetching solution in which software scheduling or code analysis provides prefetching information and hardware executes a differential matching prefetching operation, e.g., Software (SW), Event-trigger, and Prodigy. A performance comparison result shows that with configurations of different test operators and different test input matrixes, compared to the baseline without any differential matching prefetching, the differential matching prefetcher (DMP) of the present disclosure can achieve an average of 2.06× acceleration performance, and a maximum of 5.6× acceleration performance, which is significantly better than 1.17× acceleration performance of the SW, 1.44× acceleration performance of the Event-trigger, and 1.69× acceleration performance of the Prodigy. This result shows that the DMP is able to accurately capture the irregular indirect memory access mode and efficiently perform differential matching prefetching, thereby increasing instructions per cycle (IPC) of the computing architecture.

Although implementations of the present disclosure are described above in conjunction with the accompanying drawings, the present disclosure is not limited to the specific implementations and fields of application above, and the specific implementations above are merely illustrative and instructive, and are not limiting. There are many other forms that may be made by those of ordinary skill in the art, inspired by this specification and without departing from the scope of protection of the claims of the present disclosure, all of which fall within the protection of the present disclosure.

The invention claimed is:

1. A differential matching prefetcher for coping with irregular memory access, comprising:

an access index table, an access target table, a differential matching module, an index queue, an indirect memory access candidate scoreboard, an address generator, an indirect memory access relationship table, a prefetch status handling register, a repetition filter, a continuous address filter, and a range prefetch table;

configured to monitor events of access requests and data responses between a computing core and a first level of cache, as well as between the first level of cache and a second level of cache;

wherein the access index table, the access target table, the differential matching module, the index queue, and the indirect memory access candidate scoreboard are responsible for recognition of indirect memory access;

the address generator, the indirect memory access relationship table, and the prefetch status handling register are responsible for generation and initiation of an actual prefetch behavior; and the repetition filter, the continuous address filter, and the range prefetch table are responsible for filtering a request address stream and a response data stream that are directly monitored.

2. The differential matching prefetcher according to claim 1, located in the first level of cache in a hierarchical storage structure of a CPU.

3. The differential matching prefetcher according to claim 1, further comprising a stride prefetcher.

4. The differential matching prefetcher according to claim 1, wherein one form of the irregular memory access is irregular memory access, and types of the indirect memory access comprise: multi-level indirect memory access, multi-way indirect memory access, indirect single-point memory access, and indirect range memory access.

5. The differential matching prefetcher according to claim 1, wherein the access index table is a unit with a storage function located in the first level of cache, and each table entry in the table is divided into three parts: an index PC value, last monitored index data, and a differential sequence of the index data.

6. The differential matching prefetcher according to claim 1, wherein the access target table is a unit with a storage function and used for recording prefetch target address information, the target address information recorded by the access target table is used for performing matching of an indirect memory access relationship, and each table entry in the table is divided into four parts: a target PC value to be matched, a last monitored target address, a target range counter, and a differential sequence of the target address.

7. The differential matching prefetcher according to claim 1, wherein the differential matching module is a main logical operation functional unit for recognizing an indirect memory access relationship, and the differential matching module uses a sliding matching method to match a differential sequence of a target address of a table entry of the access target table corresponding to a target PC value with a differential sequence of index data of a table entry of the access index table corresponding to an index PC value.

8. The differential matching prefetcher according to claim 1, wherein the index queue is a functional unit for storing information related to a currently recognized stream access PC value as well as a recognized indirect memory access PC value, and each table entry in the index queue is divided into three parts: an index PC value, a tried counter, and a matched counter.

9. The differential matching prefetcher according to claim 1, wherein the indirect memory access candidate scoreboard is a storage functional unit for screening a target PC value corresponding to an index PC value in the index queue that is possible to form an indirect memory access relationship with the index PC value, and the type of possible target PC value is called a candidate target PC value.

* * * * *